(12) United States Patent
Kurahara et al.

(10) Patent No.: US 12,176,995 B2
(45) Date of Patent: Dec. 24, 2024

(54) INFORMATION PROCESSING DEVICE, INFORMATION PROCESSING METHOD, AND PROGRAM

(71) Applicant: Infostellar Inc., Tokyo (JP)

(72) Inventors: Naomi Kurahara, Tokyo (JP); Kazuo Ishigame, Tokyo (JP)

(73) Assignee: Infostellar Inc., Tokyo (JP)

( * ) Notice: Subject to any disclaimer, the term of this patent is extended or adjusted under 35 U.S.C. 154(b) by 474 days.

(21) Appl. No.: 17/625,161

(22) PCT Filed: Mar. 16, 2020

(86) PCT No.: PCT/JP2020/011451
§ 371 (c)(1),
(2) Date: Jan. 6, 2022

(87) PCT Pub. No.: WO2021/019827
PCT Pub. Date: Feb. 4, 2021

(65) Prior Publication Data
US 2022/0271829 A1    Aug. 25, 2022

(30) Foreign Application Priority Data
Jul. 26, 2019    (JP) .................. 2019-138135

(51) Int. Cl.
*H04B 7/185*    (2006.01)
*H04B 7/155*    (2006.01)

(52) U.S. Cl.
CPC ......... *H04B 7/18513* (2013.01); *H04B 7/155* (2013.01)

(58) Field of Classification Search
CPC ..... H04W 72/23; H04W 72/04; H04W 16/14; H04W 72/21; H04W 88/06; H04W 76/15;
(Continued)

(56) References Cited

U.S. PATENT DOCUMENTS

2002/0041251 A1    4/2002    Yamaashi et al.
2002/0155833 A1    10/2002    Borel
(Continued)

FOREIGN PATENT DOCUMENTS

EP    3493428 A1    6/2019
JP    2002071782 A    3/2002
(Continued)

OTHER PUBLICATIONS

European Extended Search Report dated Aug. 12, 2022 for European Application No. 20846985.8.
(Continued)

*Primary Examiner* — Khalid W Shaheed
(74) *Attorney, Agent, or Firm* — EIP US LLP

(57) ABSTRACT

An information processing device performs a process of presenting a specification page for specifying a search condition with respect to a channel of a downlink and an uplink between a satellite station and a ground station, a process of presenting a search result page that presents a list of ground stations retrieved as a result of a search based on a condition entered on the specification page, the search result page allowing a ground station to be specified and entered, and a process of presenting a communication plan page that displays a communication plan employing one or more ground stations specified on the search result page.

8 Claims, 17 Drawing Sheets

(58) Field of Classification Search
CPC . H04W 72/12; H04W 28/18; H04W 72/0446; H04W 48/12; H04W 76/10; H04W 8/24; H04W 72/53
See application file for complete search history.

(56) References Cited

U.S. PATENT DOCUMENTS

2002/0190897 A1  12/2002  Yamaashi et al.
2018/0034536 A1   2/2018  Trutna et al.

FOREIGN PATENT DOCUMENTS

| JP | 2004511175 A | 4/2004 |
| JP | 2010258507 A | 11/2010 |
| JP | 2014172553 A | 9/2014 |
| WO | 9922529 A1 | 5/1999 |
| WO | 2002030007 A1 | 4/2002 |
| WO | 2017116534 A1 | 7/2017 |

OTHER PUBLICATIONS

International Search Report dated Jun. 5, 2020 for PCT Application No. PCT/JP2020/011451.

FIG. 8

Communication Channel
Channel#1

Downlink select your frequency band

| Ka Band 20GHz | X Band 7GHz | S Band 3GHz | UHF Band 300MHz-3GHz |

○ I haven't decided yet

Enter detailed information

Properties ∧

Frequency Range

FROM 2025 MHz    TO 2200 MHz

Maximum Bandwidth

100 MHz

Modulations

| ○ FSK | ○ AFSK | ○ BPSK | ○ MFSK | ○ QPSK |
| ○ PSK8 | ○ PSK16 | ○ PSK32 | ○ PSK64 | ○ PSK128 |
| ○ PSK256 | ○ OQPSK | ● QAM8 | ○ QAM16 | ○ QAM32 |
| ○ QAM64 | ○ QAM128 | ○ QAM256 | ○ MSK | ○ GMSK |

Maximum data rate

MAXIMUM 9600 bps

Polarization Type

☐ Vertical    ☑ Horizontal    ☑ RHCP    ☐ LHCP

Close

Enter detailed information

Advanced properties ∧

Link Availability    Minimum Satellite Antenna G/T 99.9 %    -20 dB/K

Antenna Type

○ Dipole    ● Dish

Required minimum Pointing accuracy 0.8"

Close

Save    Search ground statioun    Add channel 10 ground station matched

INFORMATION PROCESSING DEVICE, INFORMATION PROCESSING METHOD, AND PROGRAM

CROSS-REFERENCE TO RELATED APPLICATIONS

This application is a national phase application of International Application No. PCT/JP2020/011451, filed Mar. 16, 2020, which claims priority to Japanese Application No. JP2019-138135, filed Jul. 26, 2019, under 35 U.S.C. § 119 (a). Each of the above-referenced patent applications is incorporated by reference in its entirety.

TECHNICAL FIELD

The present technology relates to an information processing device, an information processing method, and a program, and, in particular, to a technology concerning presentation of information regarding a ground station.

BACKGROUND ART

A communication system for performing communication between a satellite station and a ground station installed on the ground is known.

PTL 1 mentioned below discloses a system in which, while a satellite station that substantially circles around the center of the earth along an orbit is tracked by a ground antenna of a ground station installed on the ground of the earth, communication is performed via propagation of radio waves between the ground antenna and a satellite antenna of the satellite station.

CITATION LIST

Patent Literature

PTL 1: JP 2010-258507A

SUMMARY OF INVENTION

Technical Problems

A major concern for a satellite business proprietor that intends to increase the number of launches of satellite stations is an insufficient number of ground stations that are available for communication with the satellite stations. Although ground stations owned by the proprietor itself and the like may be sufficient for the communication with the satellite stations when a first few launches of satellite stations have been done, use of ground stations provided by ground station providers all over the world will be necessary when the number of satellite stations launched is further increased.

Before employing a ground station provided by a ground station provider, the satellite business proprietor needs to consider whether the ground station provided by the ground station provider meets specifications for the communication with the satellite station of the proprietor, how much cost will be needed for use thereof, and so on.

Thus, satellite business proprietors typically send a document such as an RFI (Request for Information) or an RFP (Request for Proposal) to ground station providers use of which is to be considered, to acquire important information regarding ground stations from the ground station providers.

However, it is not easy for a satellite business proprietor to find, from among a number of ground station providers, a company that owns a ground station having such specifications as to allow communication with a satellite station owned by the proprietor. Continuing to send documents such as RFIs or RFPs to ground station providers to acquire important information regarding ground stations until a proper ground station provider is found is a burden to the satellite business proprietor, and is a major cause of an extended lead time for preparation of a ground station and a start of operation thereof.

Thus, an object of the present technology is to provide a system for a satellite business proprietor that facilitates a search for a ground station having such specifications as to allow communication with a satellite station of the satellite business proprietor, and that facilitates acquisition of important information regarding a retrieved ground station.

Solution to Problems

An information processing device according to the present technology includes a user interface section that performs a process of presenting a specification page for specifying a search condition with respect to a channel of a downlink and an uplink between a satellite station and a ground station, a process of presenting a search result page that presents a list of ground stations retrieved as a result of a search based on a condition entered on the specification page, the search result page allowing a ground station to be specified and entered, and a process of presenting a communication plan page that displays a communication plan employing one or more ground stations specified on the search result page.

Thus, the list of the ground stations retrieved as a result of the specification of the search condition with respect to the channel is presented, and if a ground station(s) is selected from the presented list, a communication plan in which information regarding the selected ground station(s) is reflected is automatically created and is presented as the communication plan page.

In the information processing device according to the present technology, it is conceivable that the specification page presented by the user interface section has a plurality of pages including a band specification page that allows specifications concerning a band for the downlink and a band for the uplink between the satellite station and the ground station, and a communication specification page that allows setting up of one of or both a communication configuration for the band for the downlink selected on the band specification page and a communication configuration for the band for the uplink selected on the band specification page.

This makes it possible to specify the frequency bands of the downlink and the uplink and the communication configurations for the frequency bands, as the search conditions for ground stations.

In the information processing device according to the present technology, it is conceivable that the user interface section performs, in response to an operation performed on the search result page to request detailed information regarding a ground station, a process of presenting a detail page displaying the detailed information regarding the corresponding ground station.

This makes it possible to check the detailed information regarding the retrieved ground station.

It is conceivable that the information processing device according to the present technology further includes a search section that performs a process of searching for ground stations on the basis of the search condition entered on the specification page, to obtain a search result.

This enables the searching process to be accomplished in the information processing device.

It is conceivable that the information processing device according to the present technology further includes a plan generation section that performs a process of generating a communication plan on the basis of information regarding the one or more ground stations specified on the search result page.

This enables the plan generation process to be accomplished in the information processing device.

In the information processing device according to the present technology, it is conceivable that a specification of a search condition with respect to a channel of a downlink alone is enabled on the specification page.

This makes it possible to perform a search for ground stations on the basis of a search condition(s) with only the downlink set, without consideration given to information regarding the uplink.

In the information processing device according to the present technology, it is conceivable that the specification page allows a search request to be made without a specification of a search condition with respect to a channel of a downlink or an uplink.

This makes it possible to perform a search for ground stations in a state in which a search condition(s) with respect to a channel of only one of the downlink and the uplink is specified, allowing a search for ground stations to be performed without specifying search conditions with respect to the channels of both the downlink and the uplink.

In the information processing device according to the present technology, it is conceivable that a specification of at least any one of a bandwidth, a modulation method, and a data rate is enabled on the communication specification page.

This makes it possible to perform a search for ground stations with the bandwidth, the modulation method, the data rate, etc., set as the search conditions.

An information processing method according to the present technology is performed by an information processing device. The method includes a process of presenting a specification page for specifying a search condition with respect to a channel of a downlink and an uplink between a satellite station and a ground station, a process of presenting a search result page that presents a list of ground stations retrieved as a result of a search based on a condition entered on the specification page, the search result page allowing a ground station to be specified and entered, and a process of presenting a communication plan page that displays a communication plan employing one or more ground stations specified on the search result page.

A program according to the present technology is a program for causing an information processing device to perform the above-described processes.

Advantageous Effects of Invention

The present technology makes it possible to easily search for ground stations use of which is to be considered, and to easily acquire information regarding retrieved ground stations.

Note that the advantageous effects mentioned above are not necessarily restrictive, and that any of the advantageous effects described in the present disclosure may be achieved.

BRIEF DESCRIPTION OF DRAWINGS

FIG. 8 is a first explanatory diagram of a communication specification page according to the embodiment.

DESCRIPTION OF EMBODIMENTS

Figure 1:
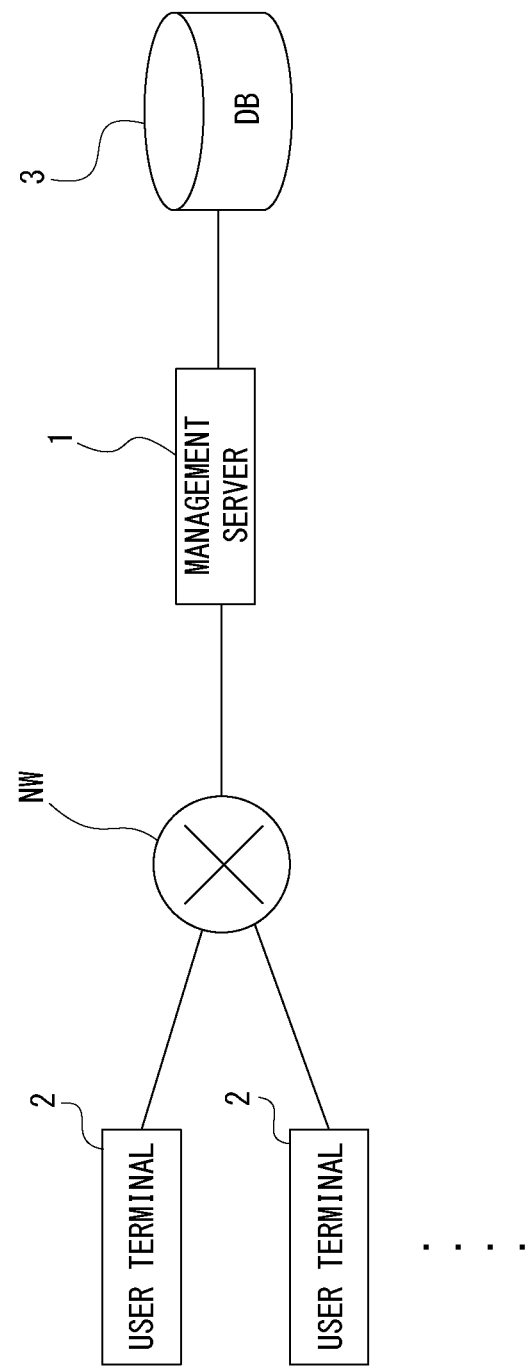
FIG. 1 is a diagram illustrating an example configuration of a network system according to an embodiment.

Hereinafter, an embodiment will be described in the following order.

<1. Overall configuration>
<2. Functions of management server, user terminals, and DB>
<3. Modes of presentation of pages on user terminal>
[3-1. Outlines of pages in ground station information providing system]
[3-2. Outline of band specification page]
[3-3. Outline of communication specification page]
[3-4. Outlines of search result page and detail page]
[3-5. Outline of communication plan page]
<4. Processes in ground station information providing system>
<5. Summary>
<6. Program and storage medium>

In addition, descriptions of terms used in the description of the embodiment are provided below.

A satellite station refers to a satellite station (satellite station) as a station that performs wireless communication. An antenna installed on a satellite station will be designated as a satellite antenna. A satellite station is, for example, a satellite station that orbits the earth.

A ground station refers to a radio facility on the ground which is used to perform communication with a satellite station. The ground station includes radio equipment such as an antenna. An antenna installed on a ground station will be designated as a ground antenna.

A user refers to an entity that uses a ground station information providing system described in the following description of the embodiment, and is, for example, a satellite business proprietor.

A satellite business proprietor refers to a business proprietor that operates a satellite station. The satellite business proprietor may own a ground antenna for performing communication with its own satellite station. In other words, the satellite business proprietor may be a ground antenna business proprietor as well.

A ground station provider refers to a business proprietor that operates a ground station. Examples thereof include a provider of a service that uses a ground station, such as a teleport, a university, a research institution, a satellite business proprietor that owns a ground antenna for communication with its own satellite, and so on.

A pass refers to one instance of communication from a start to an end of a communication between one satellite station and one ground station.

A TLE (Two-Line Element set) refers to a format for representing orbit information of a satellite station, or the orbit information itself.

A downlink refers to a communication that makes a transmission from a satellite station to a ground station, while an uplink refers to a communication that involves a transmission from a ground station to a satellite station.

A channel refers to one channel of communication that is formed as a downlink or an uplink.

A channel may have, for example, a set of uplink frequencies for transmission to a satellite and downlink frequencies for reception from a satellite. In another channel, only downlink frequencies may be set.

A communication plan refers to a collection of pieces of information regarding a ground station(s) required when a satellite business proprietor considers utilization, and includes, as a collection of pieces of information, the amount of data that can be received in one day at one or a plurality of selected ground stations, information regarding a pass (es), a site(s) of the ground station(s), parameters specified when searching for the ground station(s), information regarding each selected ground station, such as a name, an external appearance, a channel speed, G/T, and whether or not a download license is required, and other information, for example.

<1. Overall Configuration>

A ground station information providing system according to the embodiment of the present technology will be described below.

The ground station information providing system functions as a system that, when a downlink and/or uplink channel(s) between satellite and ground stations and details thereof have been specified as conditions for searching for ground stations, presents a search result indicating a ground station(s) matching the specified search conditions, and provides, as a communication plan, various pieces of information regarding the presented ground station(s).

In the following description, the ground station information providing system may be designated simply as the present system.

With reference to FIG. 1, an example configuration of the present system according to the embodiment will be described below.

As illustrated in FIG. 1, in a network system according to the present embodiment, a management server 1 and one or a plurality of user terminals 2 are connected via a network NW in such a manner as to be capable of mutual communication. In addition, the management server 1 is capable of making access to a database 3.

Note that, hereinafter, the database may be designated as a DB (Database).

Various configurations of the network NW are applicable. For example, the Internet, an intranet, an extranet, a LAN (Local Area Network), a CATV (Community Antenna Television) communication network, a VPN (Virtual Private Network), a telephone line network, a mobile communication network, a satellite communication network, and so on are applicable.

In addition, various transmission media are applicable as a transmission medium that constitutes the entire network NW or a part of the network NW. For example, wired media such as IEEE (Institute of Electrical and Electronics Engineers) 1394, a USB (Universal Serial Bus), a power-line carrier, and a telephone line, and wireless media such as infrared light like IrDA (Infrared Data Association), Bluetooth (registered trademark), a 802.11 wireless medium, a mobile phone network, a satellite channel, and a digital terrestrial network, are applicable.

The management server 1 is an information processing device managed by an operator that provides the present system. The management server 1 is implemented by, for example, a computer device that has a communication function and that is installed in a company of the operator, or other devices.

Each user terminal 2 is an information processing device used by a user of the present system. The user terminal 2 is implemented by, for example, a computer device having a communication function or other devices. In addition, the user terminal 2 may be implemented by a PDA (Personal Digital Assistant) or a feature phone having a communication function, or by a smart device such as a smart phone or a tablet terminal, or the like.

The DB 3 represents a collection of DBs in which information necessary for the management server 1 to perform processes is stored. The details of the DB 3 will be described below.

Next, the hardware configuration of each of the information processing devices that form the management server 1 and the user terminals 2 illustrated in FIG. 1 will be described with reference to FIG. 2. Each of the devices represented as the management server 1 and the user terminals 2 can be implemented as a computer device capable of information processing and information communication, as illustrated in FIG. 2.

Figure 2:
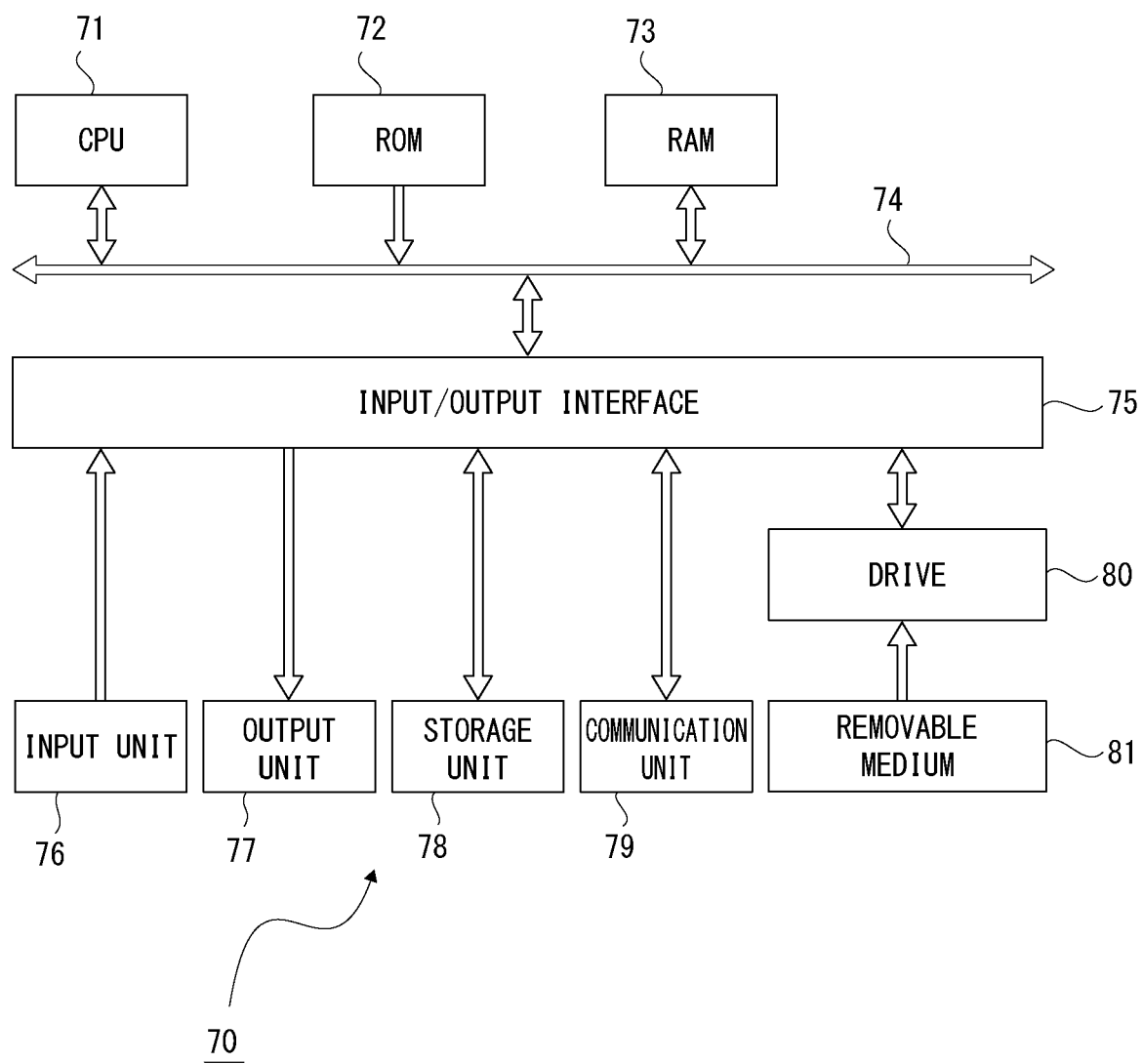
FIG. 2 is a diagram of a hardware configuration according to the embodiment.

In FIG. 2, a CPU (Central Processing Unit) 71 of the computer device performs various processes according to a program(s) stored in a ROM (Read Only Memory) 72 or a program loaded from a storage unit 78 to a RAM (Random Access Memory) 73. In the RAM 73, data necessary for the CPU 71 to perform various processes and so on are also stored as appropriate.

The CPU 71, the ROM 72, and the RAM 73 are interconnected via a bus 74. An input/output interface 75 is also connected to the bus 74.

To the input/output interface 75, connected are: an input unit 76 formed by a keyboard, a mouse, a touch panel, and/or the like; an output unit 77 formed by a display that includes an LCD (Liquid Crystal Display), a CRT (Cathode Ray Tube), an organic EL (Electroluminescence) panel, or the like, a loudspeaker, and so on; the storage unit 78 formed by an HDD (Hard Disk Drive), a flash memory device, or the like; and a communication unit 79 that performs a communication process and an inter-device communication via the network NW.

In addition, a media drive 80 is also connected to the input/output interface 75 as necessary, and a removable medium 81 such as a magnetic disk, an optical disk, a magneto-optical disk, or a semiconductor memory is loaded thereon as appropriate to perform writing and/or reading of information to and/or from the removable medium 81.

Such a computer device as described above allows data and a program to be uploaded and downloaded via communication using the communication unit 79, and allows data and a program to be passed via the removable medium 81.

The CPU 71 performs processes/operations on the basis of various programs, for each of the management server 1 and the user terminals 2, to perform required information processing and communication.

Note that each of the information processing devices that form the management server 1 and the user terminals 2 may not necessarily be implemented by a single computer device as illustrated in FIG. 2 and may alternatively be implemented by a plurality of computer devices forming a system. The plurality of computer devices may form the system using a LAN (Local Area Network) or the like, or may be remotely located in such a manner as to be capable of communicating therebetween via a VPN (Virtual Private Network) or the like using the Internet or the like.

<2. Functions of Management Server, User Terminals, and DB>

Functions of the management server 1, the user terminals 2, and the DB 3 will be described below with reference to FIG. 3.

The management server 1 and the user terminals 2 are each formed by one or a plurality of information processing devices. Each of the functions of the management server 1 and the user terminals 2 is a function implemented by a process performed according to a program in the CPU 71 in the information processing device(s). Note that processes of all or some of features described below may be implemented in hardware.

In addition, when such functions are implemented in software, the functions need not be implemented by programs independent of each other. Processes of a plurality of functions may be performed by a single program, and one function may be implemented by cooperation of a plurality of program modules.

Figure 3A:
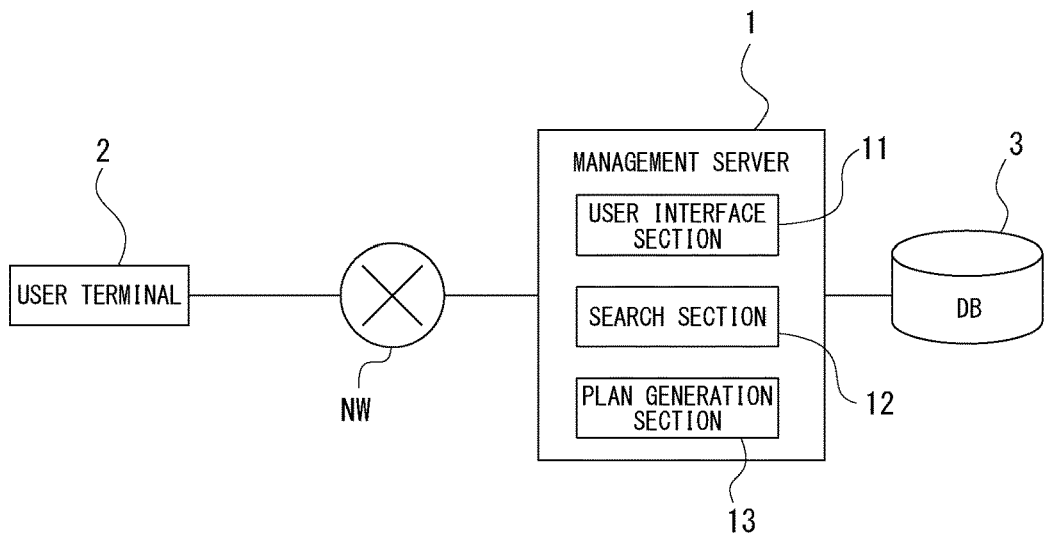
FIGS. 3A, 3B, and 3C are diagrams illustrating a variation of the example configuration of the network system according to the embodiment.

As illustrated in FIG. 3A, the management server 1 has a user interface section 11, a search section 12, and a plan generation section 13.

The user interface section 11 performs control for presenting a web page on a web browser of the user terminal 2 on the basis of web page data.

The search section 12 performs a process of searching for ground stations on the basis of a search condition(s) entered, and acquires a search result. The search section 12 generates web page data to be presented on the web browser of the user terminal 2, on the basis of the acquired search result.

The plan generation section 13 performs a process of creating a communication plan on the basis of information regarding one or a plurality of ground stations specified on a search result page. The plan generation section 13 generates a web page for presenting the created communication plan on the web browser of the user terminal 2.

In the present embodiment, the management server 1 corresponds to an information processing device recited in the claims of the present invention.

The user terminal 2 is provided with the web browser, and a web page based on web page data received from the management server 1 is displayed on the web browser.

The user terminal 2 transmits a request signal to the management server 1 according to a selection operation by the user, thereby making a request for web page data. Then, the user terminal 2 receives the web page data that is sent from the management server 1 according to the request signal, and presents the web page data on the web browser.

Note that the web page data supports responsive design, and thus allows the user terminal 2 to present the corresponding web page with a flexible layout on the device such as a computer device, a smart phone, or a tablet terminal, which may have a different screen size.

Next, the DB 3 with which the management server 1 having the above-described functions is capable of communicating will be described below.

Information regarding ground stations registered in the present system is recorded in the DB 3. Specifically, pieces of information including a name, an external appearance, latitude, longitude, a channel speed, G/T, EIRP (Equivalent Isotropically Radiated Power), information as to whether or not a download license is required and so on, a frequency range(s) of one of or both the downlink and the uplink, a maximum bandwidth, a modulation method, a maximum data rate, a polarization type, an antenna type, information regarding a pass, a price for use, pointing accuracy, etc., with respect to each ground station, are recorded so as to be associated with a ground station ID (Identification), i.e., identification information, of the corresponding ground station.

Information regarding users of the present system is stored in the DB 3. Specifically, a name, sex, age, an address, search conditions based on channels specified in the present system, and so on with respect to each user are stored in the DB 3 so as to be associated with a user ID, i.e., user identification information.

In addition, various pieces of web page data which constitute a part of the present system are stored in the DB 3. For example, web page data of a login page, pieces of web page data of a band specification page, a communication specification page, a search result page, a detail page, and a communication plan page, which will be described below, and so on are recorded in the DB 3. The management server 1 causes an image(s) and text to be presented on the user terminal 2 on the basis of the web page data acquired from the DB 3.

Such pieces of web page data are structured document files in an HTML (Hyper Text Markup Language), an XHTML (Extensible Hyper Text Markup Language), or the like, for example. In such a structured document file, text data of an article(s) or the like, image data of an image(s) attached to an article(s) or the like, and the arrangement and modes (text color, font, size, decoration, etc.) of presentation thereof are described.

Note that, needless to say, other DBs necessary for functioning as the management server 1 on the Internet may be formed.

Each DB such as the DB 3 described above may be constructed in a server computer different from the management server 1, or may be constructed in the management server 1.

Further, each DB may be implemented in any form as long as the DB is accessible to the management server 1. For example, all of the DBs may be formed in the storage section in the same system as that of the management server 1, or some or all of the DBs may be provided in a separate computer system or a computer system at a remote place or the like. Needless to say, each of the DBs need not be formed in a single device (e.g., a single HDD, etc.). In addition, each of the DBs need not be formed as a single DB. The above DB described in the description of the embodiment is a storage section(s) for information related to the processes of the embodiment, the storage section(s) being depicted as a single DB by way of example.

The present system of the present technology is implemented by the respective functions of the management server 1, the user terminal 2, and the DB 3 described above.

Although the example in which the management server 1 has the user interface section 11, the search section 12, and the plan generation section 13 as illustrated in FIG. 3A has been described in the description of the present embodiment, the respective functions thereof may be distributed among a plurality of information processing devices, and one of the functions may be implemented by a plurality of information processing devices.

Figure 3B:
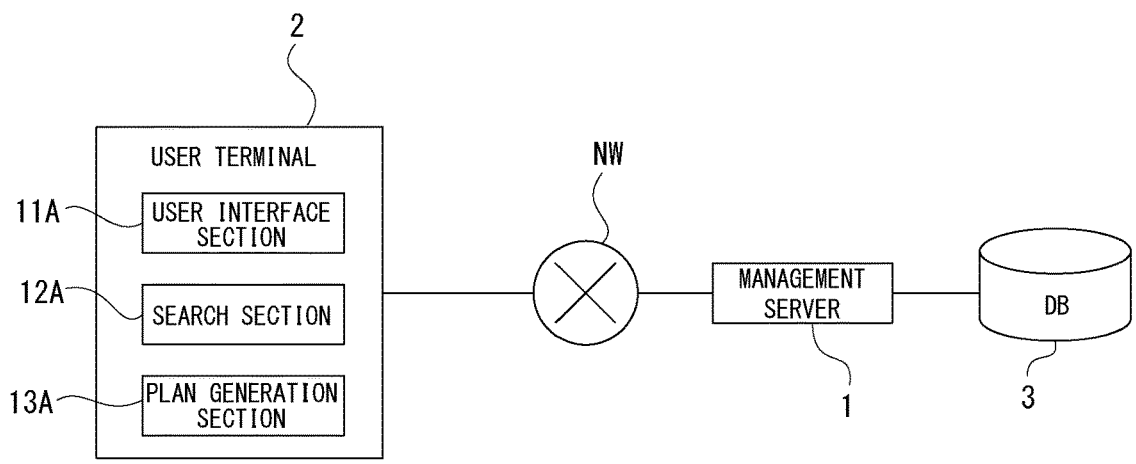

For example, the user terminal 2 may have a user interface section 11A, a search section 12A, and a plan generation section 13A as illustrated in FIG. 3B.

In this case, the user terminal 2 corresponds to the information processing device recited in the claims of the present invention.

Figure 3C:
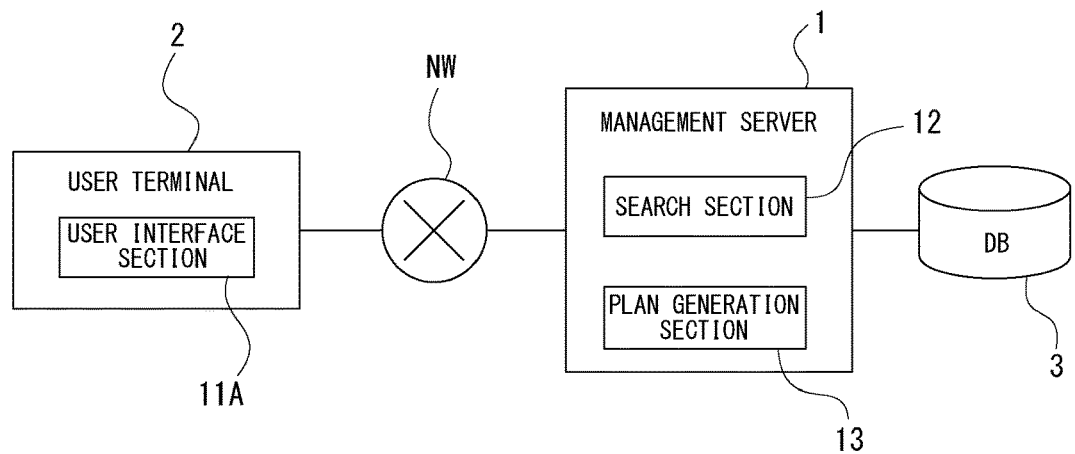

Alternatively, the user terminal 2 may have the user interface section 11A, with the management server 1 having the search section 12 and the plan generation section 13, as illustrated in FIG. 3C.

In this case, the claimed invention of the present application is implemented as a system including the management server 1 and the user terminal 2.

<3. Modes of Presentation of Pages on User Terminal>
[3-1. Outlines of Pages in Ground Station Information Providing System]

Figure 4:
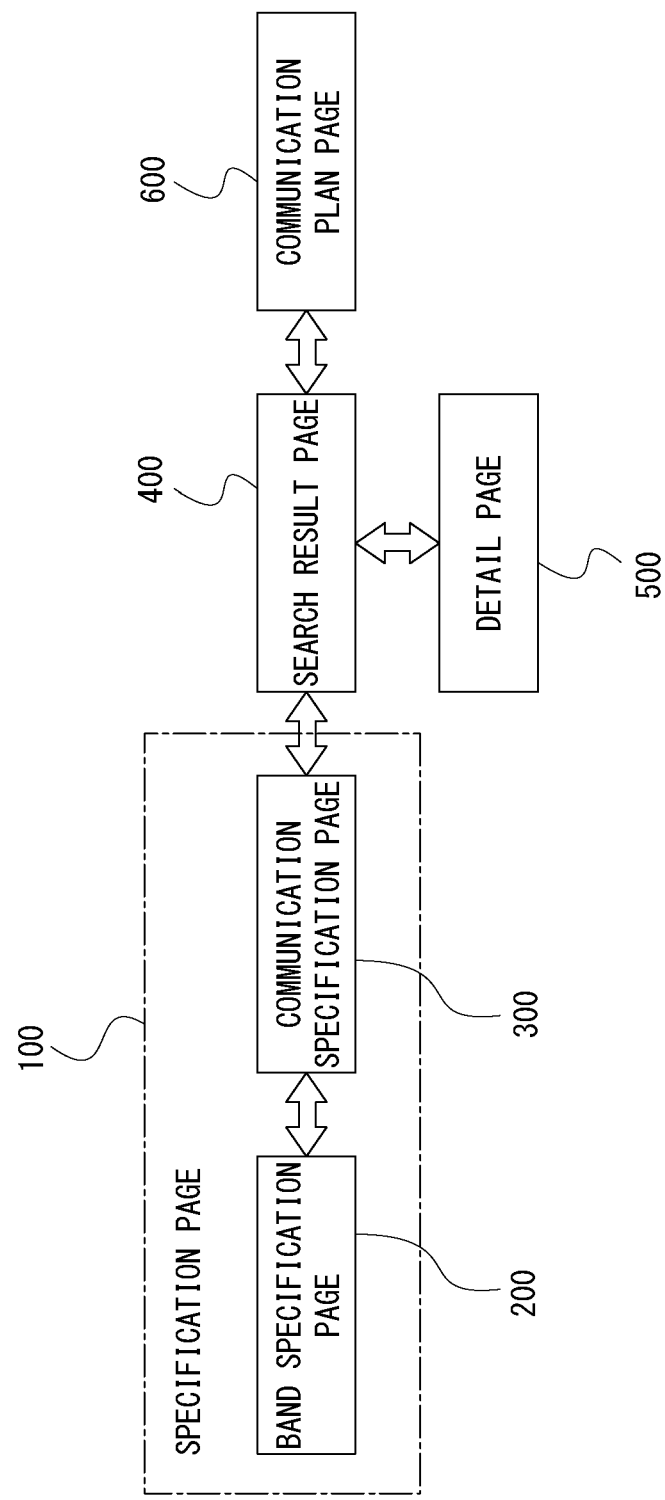
FIG. 4 is a diagram illustrating outlines of pages according to the embodiment.

Outlines of pages in the ground station information providing system according to the present embodiment will now be described below with reference to FIG. 4.

In the present system, specification pages 100, a search result page 400, a detail page 500, a communication plan page 600, and so on are presented on the web browser of the user terminal 2. The specification pages 100 are configured to allow a search condition(s) for ground stations to be specified thereon, and include a band specification page 200 and a communication specification page 300.

In the present system, the band specification page 200 is first presented on the user terminal 2 when information regarding a ground station(s) is acquired.

A specification of a channel is possible on the band specification page 200. That is, on the band specification page 200, specifications of a frequency band in the downlink and a frequency band in the uplink are possible.

After a channel is specified on the band specification page 200 with a selection operation(s) by the user, the communication specification page 300 is presented on the user terminal 2 according to a page move operation by the user.

On the communication specification page 300, a communication configuration for the frequency band of the downlink selected on the band specification page 200, and a communication configuration for the frequency band of the uplink selected on the band specification page 200, can be set up. The communication configuration refers to a detailed configuration about the channel specified on the band specification page 200, and details thereof will be described below.

The communication configurations are set up on the communication specification page 300 with input operations by the user.

Note that it is also possible to return from the communication specification page 300 to the band specification page 200 according to a page move operation by the user. At this time, the band specification page 200 is presented on the user terminal 2, allowing the specification of the channel to be changed according to a selection operation(s) by the user.

After the specification of the channel on the band specification page 200 and the setting up of the communication configurations on the communication specification page 300 are completed, a search for ground stations is performed with the channel and the communication configurations set as search conditions, in response to a search start operation by the user, and the search result page 400 is presented on the user terminal 2.

On the search result page 400, a list of a ground station(s) matching the search conditions entered on the band specification page 200 and the communication specification page 300 is presented in a selectable form as a search result. On the search result page 400, a ground station(s) with respect to which a communication plan is to be created can be selected with a selection operation(s) by the user.

At this time, it is possible to cause the detail page 500, on which detailed information regarding any of the ground station(s) presented on the search result page 400 is described, to be presented. In response to an operation for requesting detailed information regarding a given ground station being performed on the search result page 400, the corresponding detail page 500 is presented on the user terminal 2.

The user can select a ground station(s) with respect to which a communication plan is to be created while consulting the detailed information regarding the ground station on the detail page 500.

In addition, it is possible to return from the detail page 500 to the search result page 400 according to a page move operation by the user.

Note that it is also possible to return from the search result page 400 to the band specification page 200 or the communication specification page 300 according to a page move operation by the user. At this time, on the band specification page 200 or the communication specification page 300, the specification of the channel or the communication configurations can be changed according to a selection operation(s) by the user, and a search for ground stations can be performed with the changed search conditions.

In addition, it is also possible to return from the search result page 400 to the band specification page 200 according to an add channel operation by the user. In this case, a channel can be specified as a new search condition. This makes it possible to perform a search for ground stations with a plurality of channels set as search conditions.

After a ground station(s) is selected on the search result page 400, the communication plan is created in response to a communication plan request operation by the user, and the communication plan page 600 is presented on the user terminal 2.

On the communication plan page 600, the communication plan with respect to one or a plurality of ground stations specified on the search result page 400 is presented. Details of the communication plan will be described below.

The user can consider which ground station(s) to use, on the basis of the communication plan presented on the communication plan page 600.

Note that it is also possible to return from the communication plan page 600 to the search result page 400 according to a page move operation by the user. At this time, on the search result page 400, a ground station(s) with respect to which a communication plan is to be created can be re-selected.

As described above, in the present system, it is possible to create the communication plan with respect to a ground station(s) that matches the condition(s) specified by the user, by performing input operations or the like on the pages presented on the user terminal 2.

[3-2. Outline of Band Specification Page]

Figure 5:
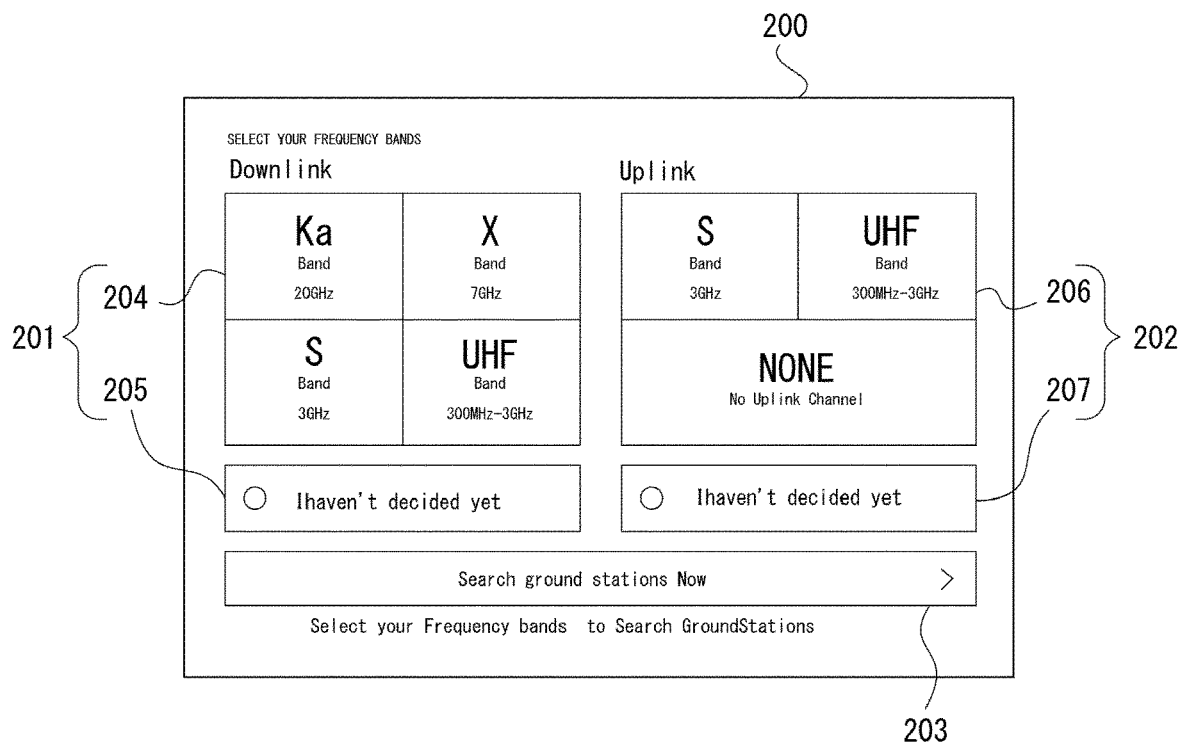
FIG. 5 is a first explanatory diagram of a band specification page according to the embodiment.
Figure 6:
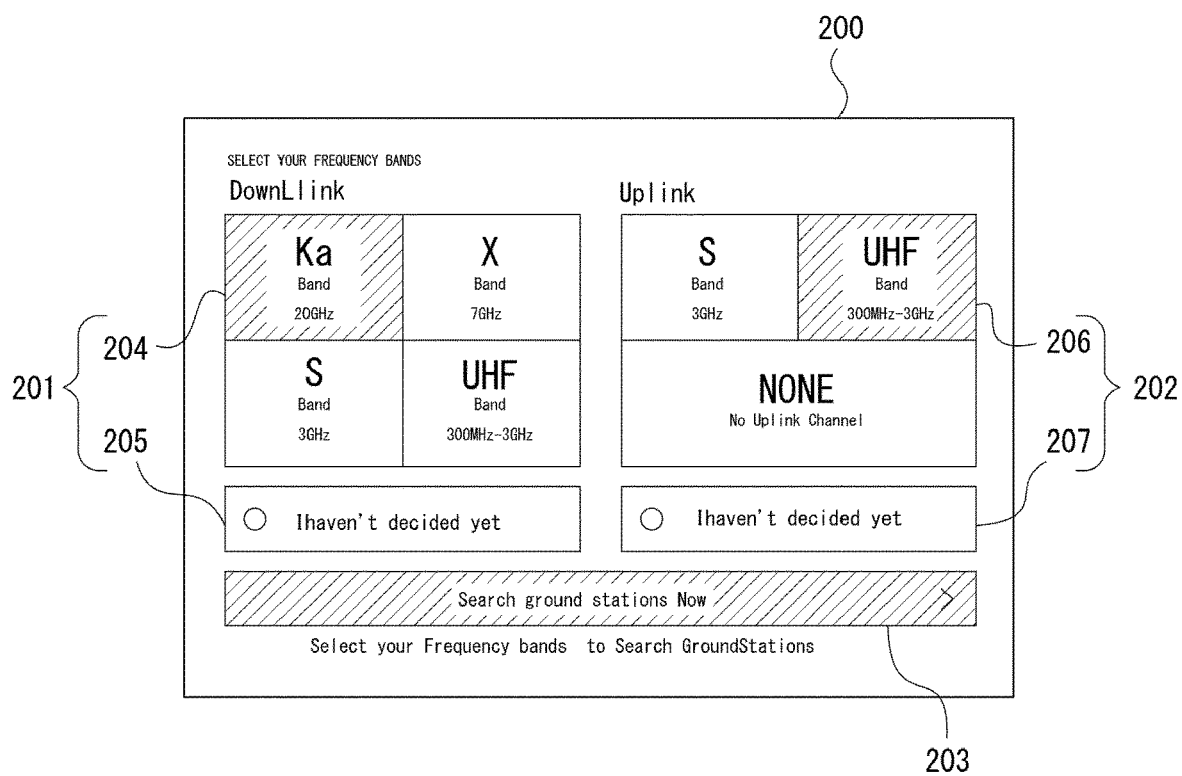
FIG. 6 is a second explanatory diagram of the band specification page according to the embodiment.
Figure 7:
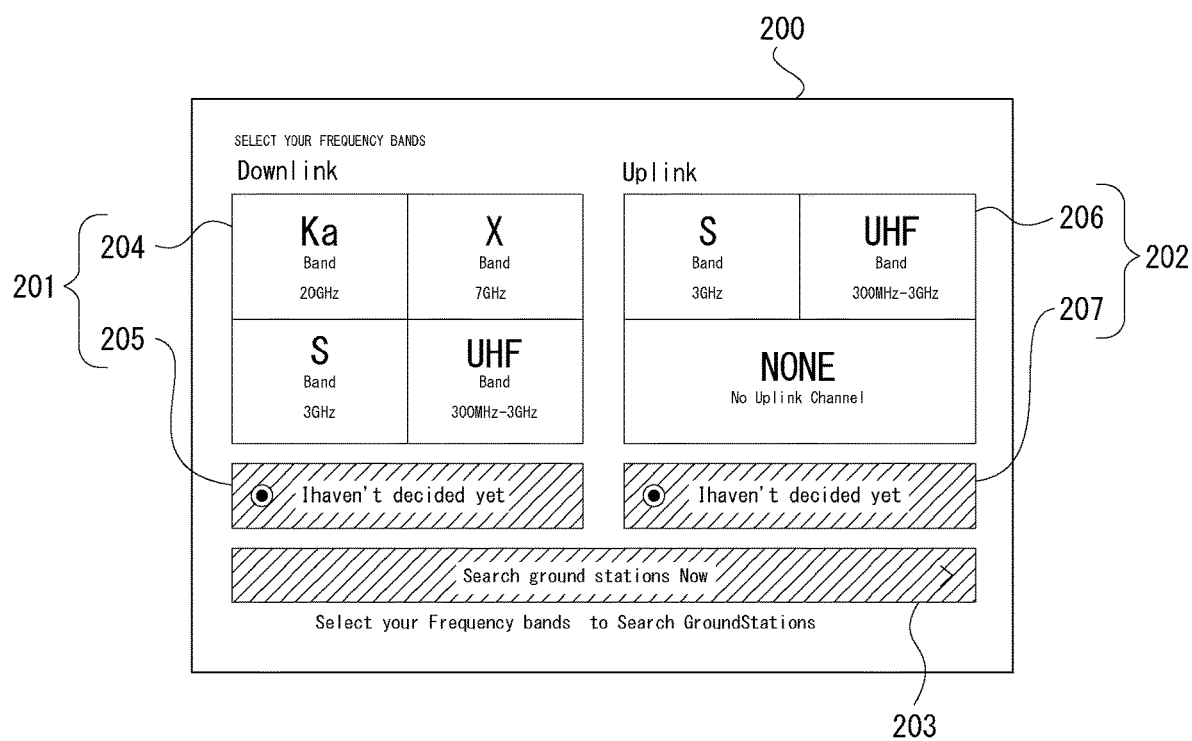
FIG. 7 is a third explanatory diagram of the band specification page according to the embodiment.

With reference to FIGS. 5 to 7, a mode of presentation of the band specification page 200 will now be described below.

On the band specification page 200, a specification of a channel can be performed by specifying frequency bands about the downlink and the uplink.

As illustrated in FIG. 5, the band specification page 200 has a first band specification area 201, a second band specification area 202, and a communication configuration button 203.

The first band specification area 201 is an area in which the frequency band of the downlink is specified, and has a specification section 204 and a non-specification section 205.

In the specification section 204, a plurality of frequency bands usable for the downlink are presented in a selectable form. Here, frequency bands of a UHF (Ultra High Frequency) band, an S-band, an X-band, and a Ka-band are selectable in the specification section 204.

The frequency band in the downlink is selected with a selection operation by the user. FIG. 6 illustrates a state in which the Ka-band has been selected as the frequency band of the downlink in a search condition.

The non-specification section 205 is an area in which an option of not specifying any frequency band for the downlink is selected. In a state in which the non-specification section 205 has been selected as illustrated in FIG. 7, ground stations will be searched for with no filtering by the frequency band of the downlink when a search for ground stations is performed.

The non-specification section 205 is selected, for example, in the case where the frequency band of the downlink has not been decided yet when the user is about to perform a search for ground stations.

The specification of the frequency band in the downlink is completed when any option of the specification section 204 and the non-specification section 205 has been selected by a user operation.

The second band specification area 202 is an area in which the frequency band of the uplink is specified, and has a specification section 206 and a non-specification section 207.

In the specification section 206, a plurality of frequency bands usable for the uplink are presented in a selectable form. Here, frequency bands of the UHF band and the S-band are selectable in the specification section 206. FIG. 6 illustrates a state in which the UHF band has been selected as the frequency band of the uplink in a search condition.

In addition, in the second band specification area 202, an option of "NONE" is also selectable. This is an option to be selected in the case where an uplink is not planned to be performed. In the case where the option of "NONE" has been selected, ground stations will be searched for on the basis of a search condition(s) with only the downlink specified, when a search for ground stations is performed.

The non-specification section 207 is an area in which an option of not specifying any frequency band for the uplink is selected. In a state in which the non-specification section 207 has been selected as illustrated in FIG. 7, ground stations will be searched for with no filtering by the frequency band of the uplink when a search for ground stations is performed.

The non-specification section 207 is selected, for example, in the case where the frequency band of the uplink has not been decided yet when the user is about to perform a search for ground stations.

The specification of the frequency band in the uplink is completed when any option of the specification section 206 and the non-specification section 207 has been selected by a user operation.

Here, as for combinations of the frequency bands, for example, a pattern of specifying the "Ka-band" as the downlink and the "S-band" as the uplink in search conditions, a pattern of specifying the "Ka-band" as the downlink in a search condition without making a search that takes the uplink into consideration, a pattern of making no setting of the uplink or the downlink in a search condition, and so on are conceivable.

The communication configuration button 203 becomes selectable in a state in which the specification of the frequency bands in the downlink and the uplink has been completed, i.e., in a state in which a channel has been specified.

As a result of the communication configuration button 203 being selected, the communication specification page 300 for making detailed settings about the channel as illustrated in FIG. 8 is presented.

[3-3. Outline of Communication Specification Page]

Figure 9:
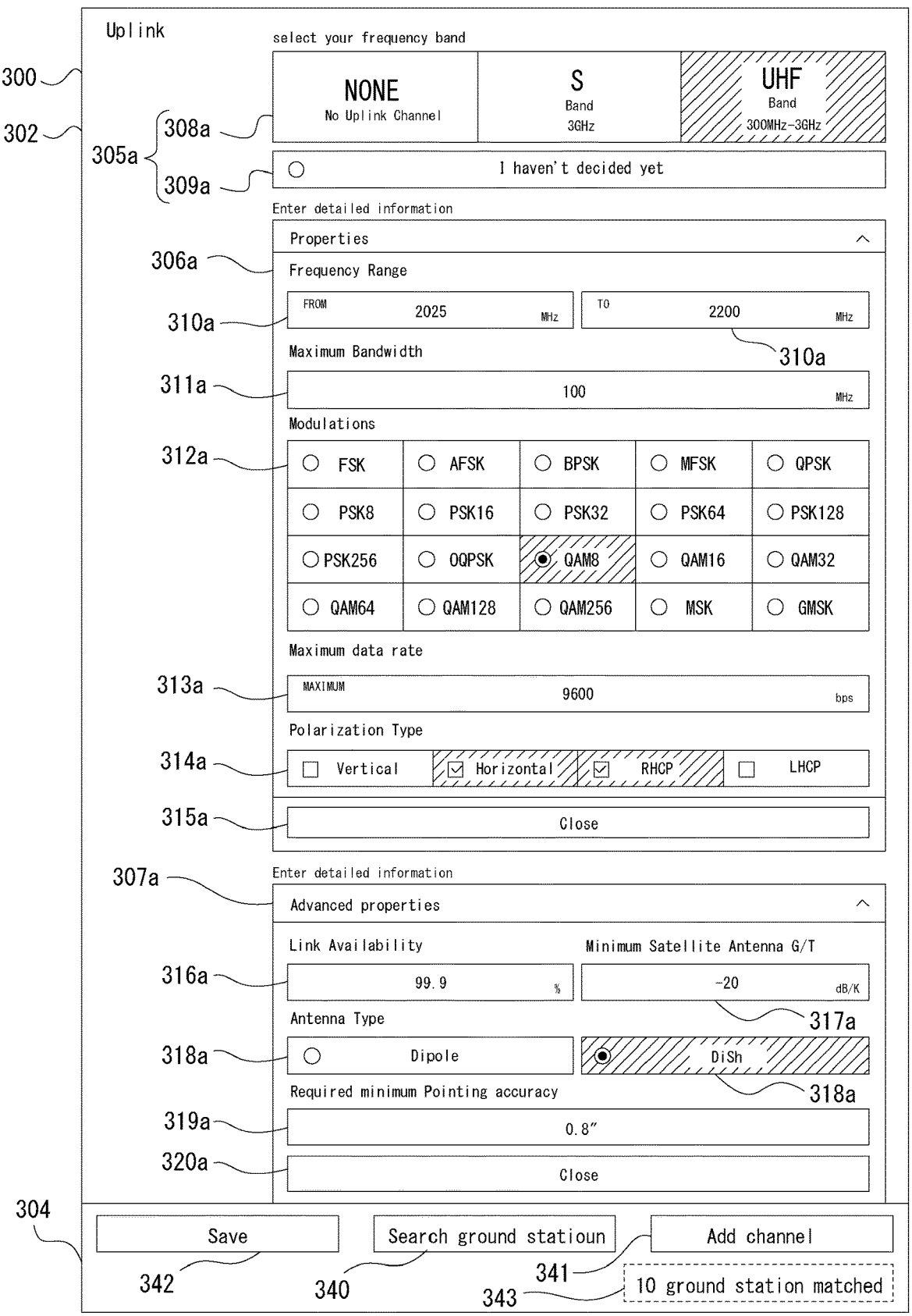
FIG. 9 is a second explanatory diagram of the communication specification page according to the embodiment.
Figure 10:
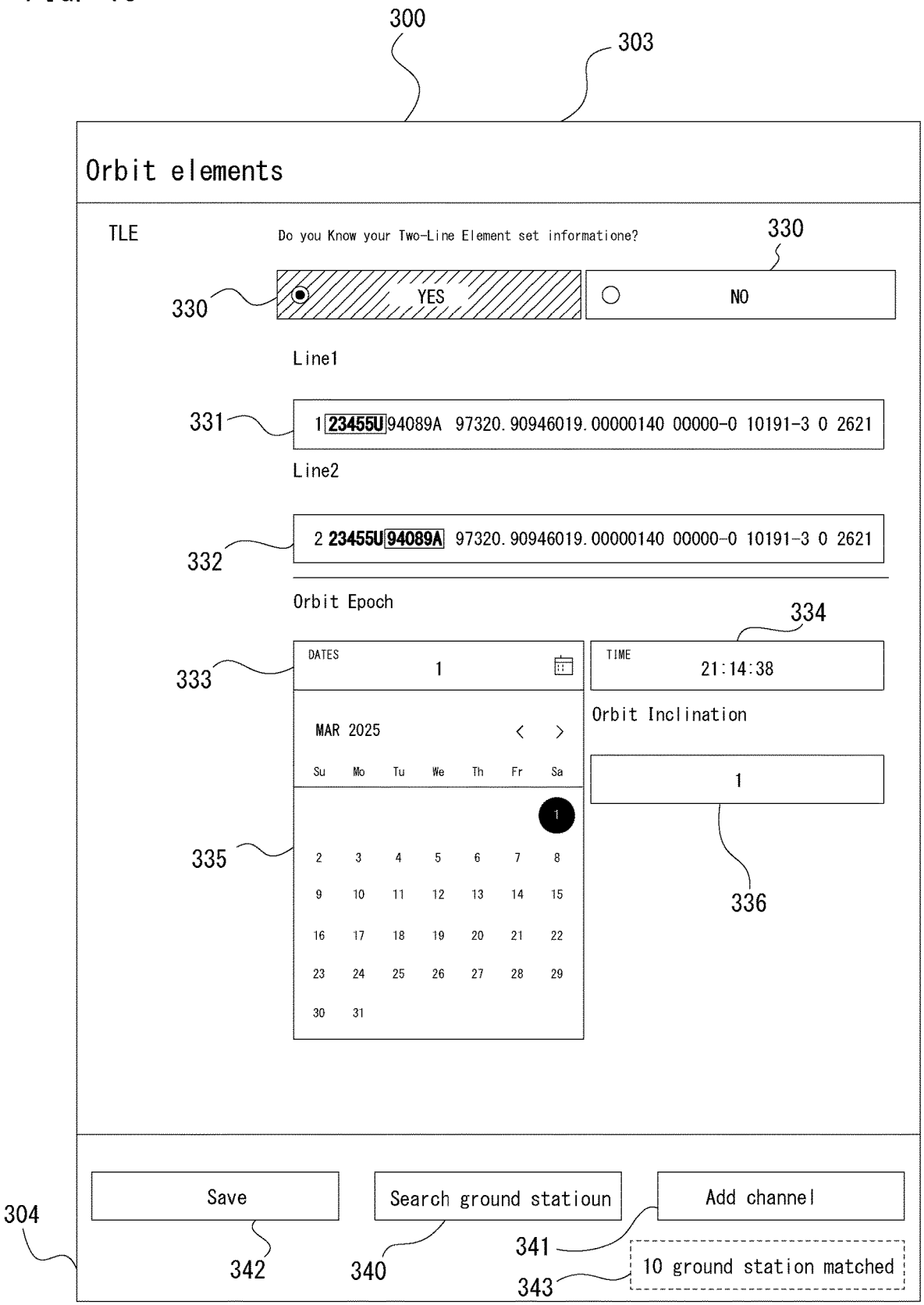
FIG. 10 is a third explanatory diagram of the communication specification page according to the embodiment.

With reference to FIGS. 8 to 10, a mode of presentation of the communication specification page 300 will now be described below.

On the communication specification page 300, setting up of one of or both a communication configuration of the channel for the frequency band of the downlink selected on the band specification page 200 and a communication configuration of the channel for the frequency band of the uplink selected on the band specification page 200 is possible.

The communication configurations refer to detailed settings about the channel specified on the band specification page 200, and refer to settings made in a first communication configuration area 301, a second communication configuration area 302, and an orbit element configuration area 303, which will be described below.

Here, on the assumption that a channel #1 is the channel specified on the band specification page 200 illustrated in FIG. 6, the communication specification page 300 for the channel #1 will be described as an example.

The communication specification page 300 has the first communication configuration area 301, the second communication configuration area 302, the orbit element configuration area 303, and a following area 304.

The first communication configuration area 301, which is illustrated in FIG. 8, the second communication configuration area 302, which is illustrated in FIG. 9, and the orbit element configuration area 303, which is illustrated in FIG. 10, are integrally formed as continuous web page data, and each area is presented on a display section of the user terminal 2 according to a scroll operation by the user.

The first communication configuration area 301 is an area in which the communication configuration for the downlink can be specified, and has a specified band presentation area 305, a property setting area 306, and a detailed setting area 307.

In the specified band presentation area 305, how the channel has been specified about the downlink on the band specification page 200 illustrated in FIG. 5 is presented.

In the case where the frequency band of the downlink has been specified on the band specification page 200, the selected band is presented in a visually recognizable form in a presentation section 308. Meanwhile, in the case where no frequency band has been specified for the downlink, a presentation section 309 is presented in a selected state.

In the property setting area 306, specifications can be made about items such as a frequency range, a bandwidth, a modulation method, a maximum data rate, and a polarization type in the downlink.

The user is able to specify a frequency range by entering the frequency range in input sections 310.

Specifiable modulation methods are presented in a selectable form in a selection section 312. In the selection section 312, FSK (Frequency Shift Keying), AFSK (Audio Frequency Shift Keying), BPSK (Binary Phase Shift Keying), MFSK (Minimum Frequency Shift Keying), QPSK (Quadrature Phase Shift Keying), PSK (Phase Shift Keying) 8, PSK16, PSK32, PSK64, PSK128, PSK256, OQPSK (Offset-Quaternary Phase Shift Keying), QAM (Quadrature Amplitude Modulation)8, QAM16, QAM32, QAM64, QAM128, QAM256, MSK (Minimum Phase Shift Keying), GMSK (Gaussian filtered Minimum Phase Shift Keying), etc., are presented in a selectable form.

The user is able to specify a modulation method by performing a selection operation on the modulation method presented in the selection section 312. FIG. 8 illustrates an example state in which QAM8 has been specified as the modulation method with the selection operation.

The user is able to specify a maximum data rate by entering a predetermined value in an input section 313.

Polarization types are presented in a selectable form in a selection section 314, and Vertical, Horizontal, RHCP (Right-Hand Circular Polarization), LHCP (Left-Handed Circularly Polarized wave), etc., are presented therein.

The user is able to specify a polarization type(s) by performing a selection operation(s) on the polarization type (s) presented in the selection section 314. FIG. 8 illustrates an example state in which Horizontal and RHCP have been specified as the polarization types with the selection operations.

In addition, a close button 315 is provided in the property setting area 306, and the user is able to temporarily hide the items specified in the property setting area 306, by performing a selection operation on the close button 315. That is, it is possible to switch the state of the items specified in the property setting area 306 between displayed and hidden states according to a user operation.

In the detailed setting area 307, specifications can be made about items such as a link availability, a minimum value of G/T (Gain-to-Noise Temperature Ratio) (Minimum Satellite Antenna G/T), an antenna type, and pointing accuracy in the downlink.

The user is able to specify a link availability by entering a predetermined value in an input section 316, and specify a minimum value of G/T by entering a predetermined value in an input section 317.

Antenna types are presented in a selectable form in selection sections 318, and a dipole antenna, a dish antenna, etc., are presented therein.

The user is able to specify an antenna type by performing a selection operation on the antenna type presented in the selection section 318. FIG. 8 illustrates an example state in which the dish antenna has been specified as the antenna type with the selection operation.

The user is able to specify a value of the pointing accuracy by entering a predetermined value in an input section 319.

In addition, a close button 320 is provided in the detailed setting area 307, and the user is able to temporarily hide the items specified in the detailed setting area 307, by performing a selection operation on the close button 320, similarly to the case of the property setting area 306. That is, it is possible to switch the state of the items specified in the detailed setting area 307 between displayed and hidden states according to a user operation.

The communication configuration of the channel for the downlink can be set up by performing the selection operations and the input operations with respect to the items in the first communication configuration area 301 described above.

The second communication configuration area 302 illustrated in FIG. 9 is an area in which the communication configuration for the uplink can be specified, and has a specified band presentation area 305a, a property setting area 306a, and a detailed setting area 307a.

In the specified band presentation area 305a, how the channel has been specified about the uplink on the band specification page 200 illustrated in FIG. 5 is presented.

In the case where the frequency band of the uplink has been specified on the band specification page 200, the selected band is presented in a visually recognizable form in a presentation area 308a. On the other hand, in the case where no frequency band has been specified for the uplink, a presentation section 309a is presented in a selected state.

Note that, in the case where an uplink is not to be performed in the communication between the satellite and ground stations, that is, in the case where the option of "NONE" has been selected in the second band specification area 202 in FIG. 5, selection operations and input operations are prohibited with respect to detailed settings described below. This is because, in the case where the option of "NONE" has been selected, a search for ground stations will be performed without a specification of the frequency band of the uplink and the communication configuration therefor taken into account, and it is thus not necessary to make the detailed settings.

Moreover, in the case where the option of "NONE" has been selected in the second band specification area 202, each of the property setting area 306a and the detailed setting area 307a may not be presented in the second communication configuration area 302 in FIG. 9.

In the property setting area 306a, specifications can be made about items such as a frequency range, a bandwidth, a modulation method, a maximum data rate, and a polarization type in the uplink.

The user is able to specify a frequency range by entering the frequency range in input sections 310a.

Specifiable modulation methods are presented in a selectable form in a selection section 312a. In the selection section 312a, FSK, AFSK, BPSK, MFSK, QPSK, PSK8, PSK16, PSK32, PSK64, PSK128, PSK256, OQPSK, QAM8, QAM16, QAM32, QAM64, QAM128, QAM256, MSK, GMSK, etc., are presented in a selectable form.

The user is able to specify a modulation method by performing a selection operation on the modulation method presented in the selection section 312a.

The user is able to specify a maximum data rate by entering a predetermined numerical value in an input section 313a.

Polarization types are presented in a selectable form in a selection section 314a, and Vertical, Horizontal, RHCP, LHCP, etc., are presented therein. The user is able to specify a polarization type(s) by performing a selection operation(s) on the polarization type(s) presented in the selection section 314a.

In addition, a close button 315a is provided in the property setting area 306a, and the user is able to temporarily hide the items specified in the property setting area 306a, by performing a selection operation on the close button 315a. That is, it is possible to switch the state of the items specified in the property setting area 306a between displayed and hidden states according to a user operation.

In the detailed setting area 307a, specifications can be made about items such as a link availability, a minimum value of G/T, an antenna type, and pointing accuracy in the uplink.

The user is able to specify a link availability by entering a predetermined numerical value in an input section 316a, and specify a minimum value of G/T by entering a predetermined numerical value in an input section 317a.

Antenna types are presented in a selectable form in selection sections 318a, and a dipole antenna, a dish antenna, etc., are presented therein. The user is able to specify an antenna type by performing a selection operation on the antenna type presented in the selection section 318a.

The user is able to specify a value of the pointing accuracy by entering a predetermined numerical value in an input section 319a.

In addition, a close button 320a is provided in the detailed setting area 307a, and the user is able to temporarily hide the items specified in the detailed setting area 307a, by performing a selection operation on the close button 320a, similarly to the case of the property setting area 306a. That is, it is possible to switch the state of the items specified in the detailed setting area 307a between displayed and hidden states according to a user operation.

The communication configuration of the channel for the uplink can be set up by performing the selection operations and the input operations with respect to the items in the second communication configuration area 302 described above.

In the orbit element configuration area 303 illustrated in FIG. 10, information regarding orbit elements for identifying an orbit of a satellite station can be entered.

In the orbit element configuration area 303, "YES" or "NO" can be selected with selection sections 330 as to whether or not information regarding a TLE of the satellite station is known.

When the selection section 330 for "YES" has been selected, it is made possible to enter, in input sections 331 and 332, pieces of information regarding a Line1 and a Line2 which are parameters used to identify the orbit of the satellite station in the TLE.

In addition, it is possible to enter, in an input section 333, the date of an epoch which indicates the point of time of the information of the orbit elements, and enter the time thereof in an input section 334. Note that, at this time, the date can also be selected on a calendar 335 to enter the date in the input section 333.

Further, it is possible to enter an orbit inclination angle (Orbit inclination) in an input section 336.

The information regarding the orbit elements can be entered by performing the selection and input operations with respect to the items in the orbit element configuration area 303 described above.

The following area 304 illustrated in FIGS. 8 to 10 is presented on a lower end portion of the user terminal 2, and is presented so as to follow a scroll operation by the user.

The following area 304 has a search button 340, an add channel button 341, a save button 342, and a number-of-ground-stations presentation section 343.

When a selection operation has been performed on the search button 340, a search for ground stations that match the search conditions based on the channel and the communication configurations thereof entered and selected is performed, and the search result page 400 presenting the search result is displayed on the user terminal 2. Here, a search for ground stations is performed with respect to the channel #1.

Note that the selection operation can be performed on the search button 340 even when the communication configurations are not set up on the communication specification page 300. In this case, a search for ground stations is performed while the band(s) of one of or both the downlink and the uplink specified on the band specification page 200 is set as the search condition.

When a selection operation has been performed on the save button 342, the search conditions entered for the given channel are recorded. Here, the search conditions entered for the channel #1 can be recorded. This can save the user time and effort for entry when performing a search for ground stations with the same search conditions.

However, when recording the search conditions entered for the channel, the user needs to make access to a website provided by the management server 1 via the user terminal 2 and perform a login process. This makes it possible to record the search conditions for each channel so as to be associated with the user ID, which is identification information, of the user.

When a selection operation has been performed on the add channel button 341, it is made possible to add a new channel in addition to the channel entered on the communication specification page 300.

For example, if a selection operation is performed on the add channel button 341 after the entry of the search conditions with respect to the channel #1 is completed, the band specification page 200 is presented on the user terminal 2. The user can enter search conditions with respect to a channel #2 in addition to the channel #1, by specifying a new frequency band(s) on the band specification page 200.

In the number-of-ground-stations presentation section 343, the number of ground stations that match the entered search conditions is presented. This enables the user to set up the communication configurations while checking the number of ground stations that match the search conditions.

In such a manner as described above, the present system allows the search conditions to be specified with respect to a plurality of channels.

When the selection operation is performed on the search button 340 with the search conditions specified with respect to a plurality of channels, a search for ground stations can be performed on the basis of the search conditions with the plurality of channels taken into account.

[3-4. Outlines of Search Result Page and Detail Page]

Figure 11:
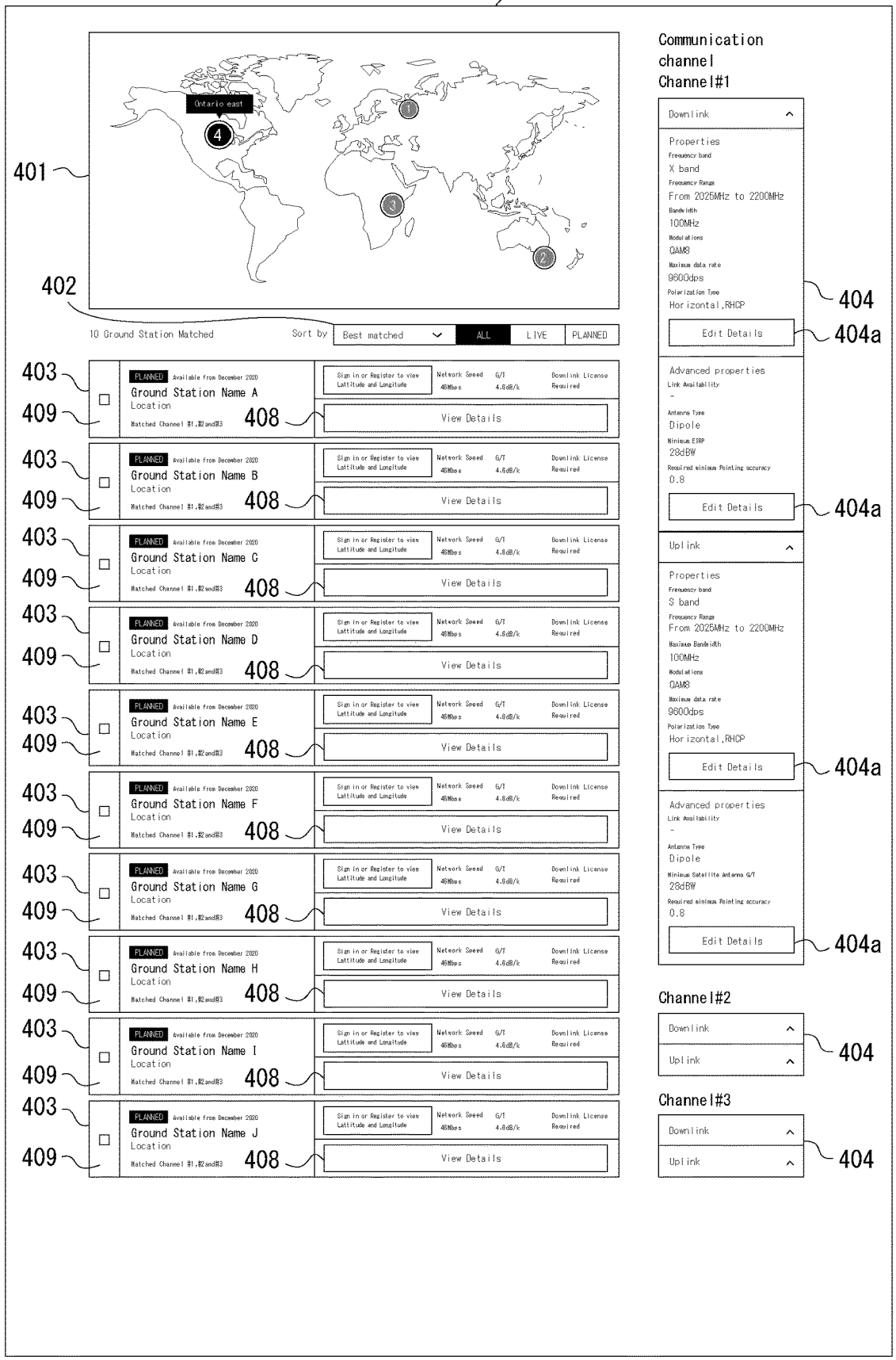
FIG. 11 is a first explanatory diagram of a search result page according to the embodiment.
Figure 12:
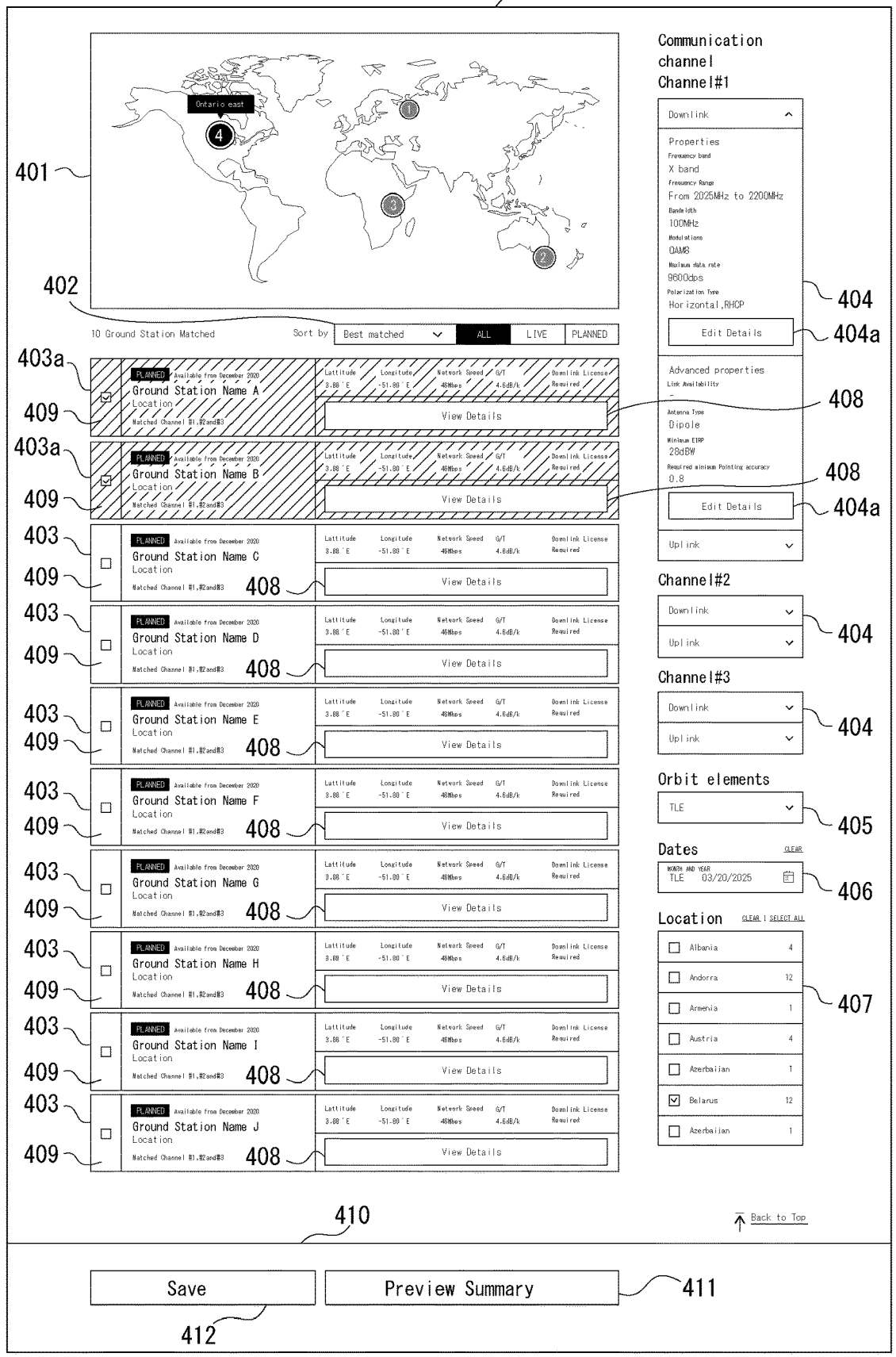
FIG. 12 is a second explanatory diagram of the search result page according to the embodiment.

With reference to FIGS. 11 and 12, a mode of presentation of the search result page 400 will now be described below.

On the search result page 400, a list of ground stations retrieved on the basis of the search conditions specified on the band specification page 200 and the communication specification page 300 is presented.

The search result page 400 has a ground station distribution presentation section 401, a presentation condition selection section 402, ground station presentation sections 403, search condition presentation sections 404, an orbit element presentation section 405, a date presentation section 406, a region specification section 407, and a following area 410.

In the ground station distribution presentation section 401, a distribution of the retrieved ground stations in each region is presented. This makes it easy to visually recognize how many ground stations that match the specified conditions are located in each region.

How the ground stations are spread geographically is directly related to the communication frequency with which the ground stations are capable of communicating, and therefore, the capability to intuitively grasp the geographical distribution of the ground stations is beneficial.

In the presentation condition selection section 402, a condition for narrowing down the ground stations to be presented in the ground station presentation sections 403, out of the retrieved ground stations, can be selected.

In the presentation condition selection section 402, options of "ALL," "LIVE," and "PLANNED" are provided in a selectable form.

Selecting "ALL" causes all of the retrieved ground stations to be presented in the ground station presentation sections 403.

Selecting "LIVE" causes only a ground station(s) that has already been integrated into a ground station reservation service provided by the applicant, to be presented in the ground station presentation section(s) 403.

Here, the ground station reservation service refers to a platform (StellarStation: registered trademark) that is provided by the applicant and that uses a cloud for sharing various ground stations scattered around the world. In this platform, a ground station for communicating with a satellite station can be reserved (a pass schedule can be set).

Selecting "PLANNED" causes only a ground station(s) that has not yet been integrated into the ground station reservation service provided by the applicant, to be presented in the ground station presentation section(s) 403.

In each search condition presentation section 404, the frequency band(s) and the communication configuration(s) therefor specified for the corresponding channel are presented. The search condition presentation section 404 is configured to allow the whole or a part thereof to be hidden as illustrated in FIG. 12.

In addition, a change in the communication configuration for each channel is made possible by performing a selection operation on an edit button 404a.

The information regarding the orbit elements is presented in the orbit element presentation section 405, and date/time information is presented in the date presentation section 406.

In the region specification section 407, each region is capable of being selected, and the ground stations can be narrowed down according to the selected region(s).

One or a plurality of ground station presentation sections 403 are provided according to the search result, and in each ground station presentation section 403, pieces of information regarding the corresponding ground station, such as a name, a channel speed, G/T, whether or not a download license is required, and a timing when an integration is to be completed in the case where an integration into the above-mentioned ground station reservation service has not been done, are presented.

In addition, in the ground station presentation section 403, a detail selection button 408 and a ground station selection section 409 are provided in a selectable form.

Figure 13:
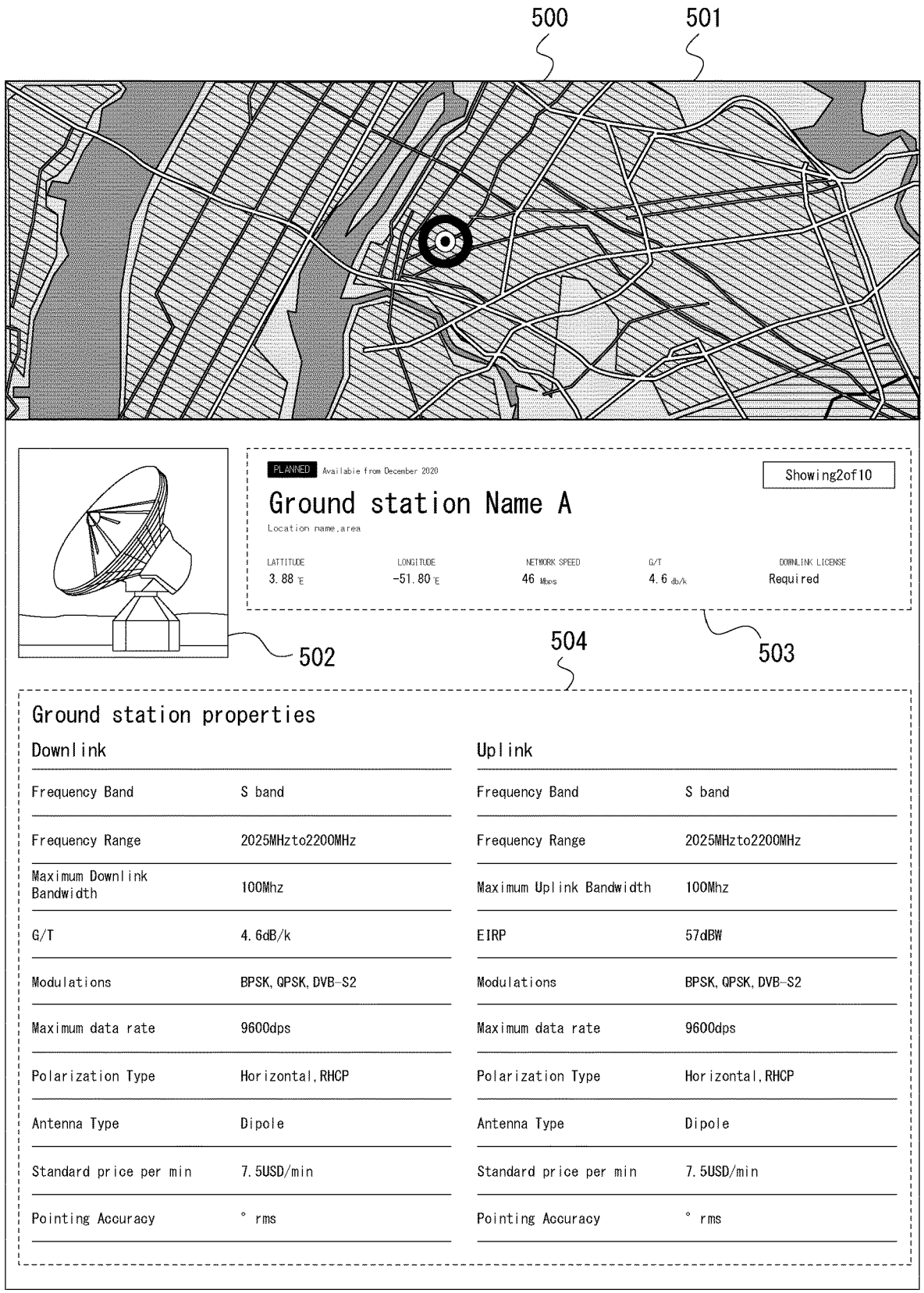
FIG. 13 is an explanatory diagram of a detail page according to the embodiment.

Selecting the detail selection button 408 causes a detail page 500 containing detailed information regarding the selected ground station, as illustrated in FIG. 13, to be presented.

In the detail page 500, a location map 501, an external appearance presentation section 502, an information display area 503, a property presentation area 504, etc., are presented.

In the location map 501, a map of an area surrounding the ground station is displayed, and an icon identifying the location of the ground station is displayed. This enables the user to recognize the precise location of the ground station.

The external appearance presentation section 502 displays the external appearance of the selected ground station. This enables the user to check the external appearance of the selected ground station.

In the information display area 503, information regarding the selected ground station, for example, information regarding a name, latitude, longitude, a channel speed, G/T, whether or not a download license is required, etc., with respect to the ground station, is presented.

In the property presentation area 504, properties concerning each of the downlink and the uplink are presented. In the property presentation area 504, pieces of information including a frequency range, a maximum bandwidth, G/T, EIRP, a modulation method, a maximum data rate, a polarization type, an antenna type, a price for use, pointing accuracy, etc., of each of the downlink and the uplink, for example, are presented.

By viewing the detail page 500 as illustrated in FIG. 13, the user is able to check information that is useful when selecting a ground station with respect to which a communication plan is to be created.

Note that the user can return from the detail page 500 to the search result page 400 by performing a selection operation on a page back button which is not illustrated.

Referring back to FIGS. 11 and 12, the ground station presentation sections 403 will be further described below.

A ground station with respect to which a communication plan is to be created can be selected from among the retrieved ground stations, by performing a selection operation on the ground station selection section 409 of the ground station presentation section 403.

Once the selection operation is performed on the ground station presentation section 403, the fact of having been selected is indicated in a visually recognizable form as illustrated by ground station presentation sections 403a in FIG. 12.

Once any ground station presentation section 403 is selected, the following area 410 is presented in a lower portion of the search result page 400.

In the following area 410, a communication plan creation button 411 and a save button 412 are provided.

When a selection operation has been performed on the communication plan creation button 411, a communication plan with respect to the ground station(s) corresponding to the selected ground station presentation section(s) 403 is generated. For example, the communication plan is generated on the basis of the information regarding the ground stations corresponding to the selected ground station presentation sections 403a as illustrated in FIG. 12.

Then, the communication plan page 600 based on the generated communication plan is presented on the user terminal 2.

In such a manner as described above, according to the present technology, not only the list of the ground stations retrieved on the basis of the search conditions specified on the band specification page 200 and the communication specification page 300 is presented on the search result page 400, but also the communication plan with respect to the selected ground station(s) can be created by selecting the ground station(s) from the list presented on the search result page 400.

Performing a selection operation on the save button 412 causes the entered search conditions and the result of the search for ground stations to be recorded. This can save the user time and effort for entering the same search conditions and performing a search for ground stations.

However, when recording the search conditions entered for the channel(s), the user needs to make access to the website provided by the management server 1 via the user terminal 2 and perform the login process. This makes it possible to record the entered search conditions and the result of the search for ground stations so as to be associated with the user ID, which is the identification information, of the user.

As described above, the ground stations retrieved on the basis of the specified search conditions are presented on the search result page 400, so that the ground stations that match the conditions desired by the user are automatically retrieved and presented on the user terminal 2 in such a manner that each of the ground stations can easily be checked.

[3-5. Outline of Communication Plan Page]

With reference to FIGS. 14 to 17, a mode of presentation of the communication plan page 600 will now be described below.

On the communication plan page 600, the communication plan generated with respect to one or a plurality of ground stations specified on the search result page 400 is presented.

As illustrated in FIGS. 14 to 17, the communication plan page 600 has a plan summary presentation area 601, a channel specification presentation area 602, a first ground station information presentation area 603, and a second ground station information presentation area 604.

Figure 14:
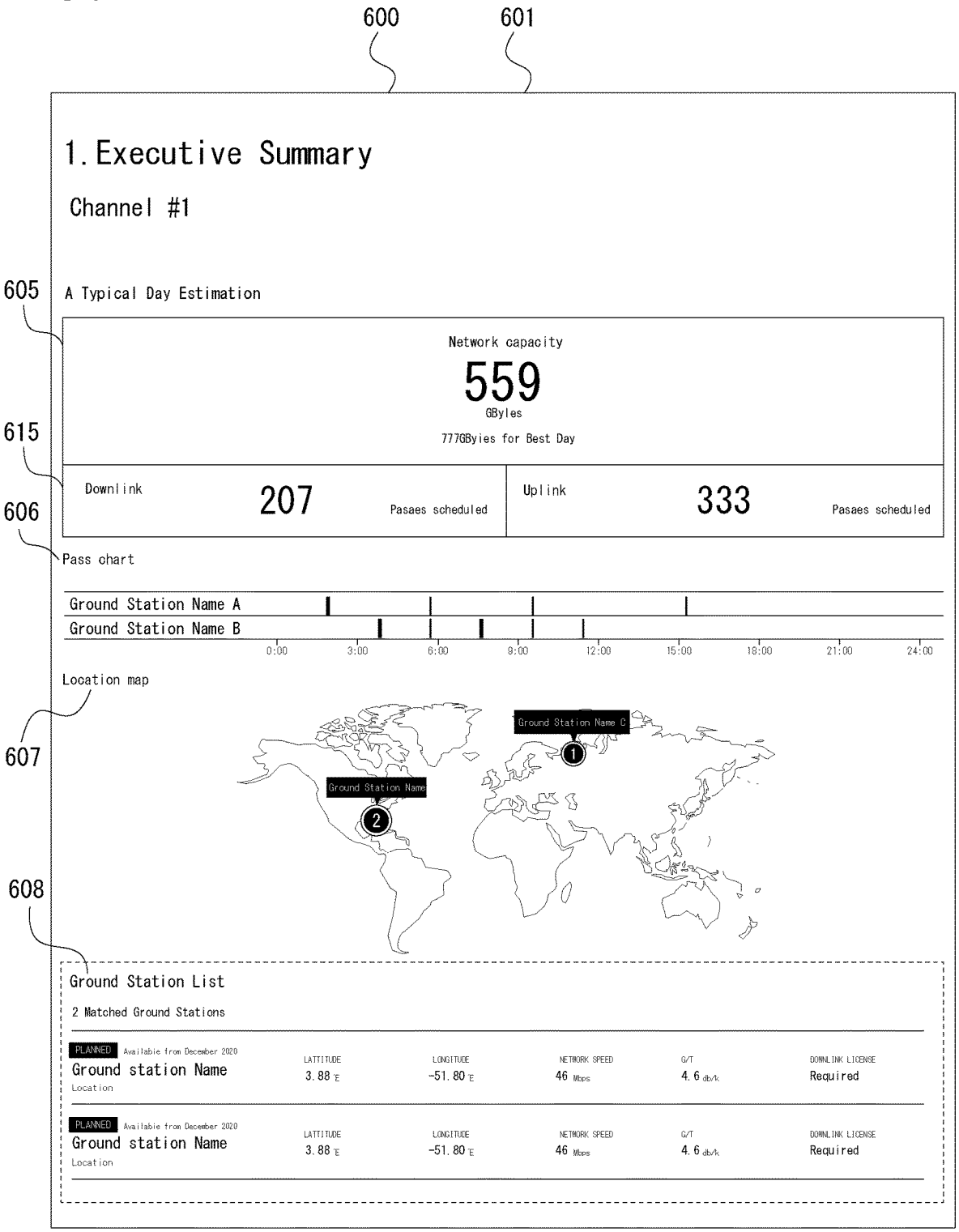
FIG. 14 is a first explanatory diagram of a communication plan page according to the embodiment.
Figure 15:
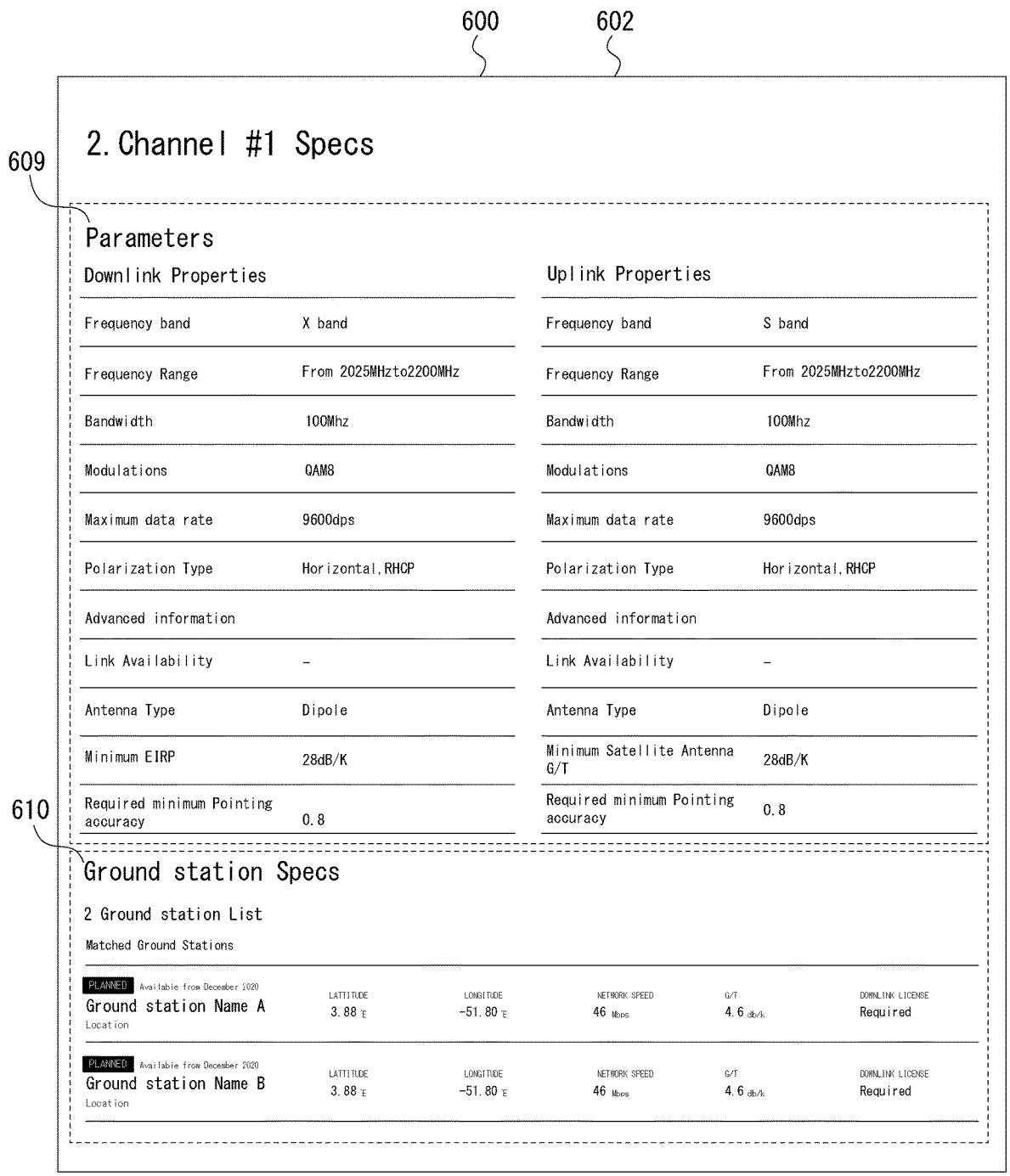
FIG. 15 is a second explanatory diagram of the communication plan page according to the embodiment.
Figure 16:
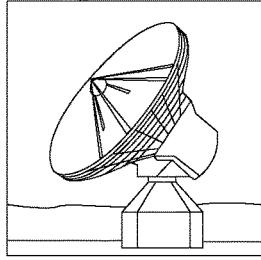
FIG. 16 is a third explanatory diagram of the communication plan page according to the embodiment.
Figure 17:
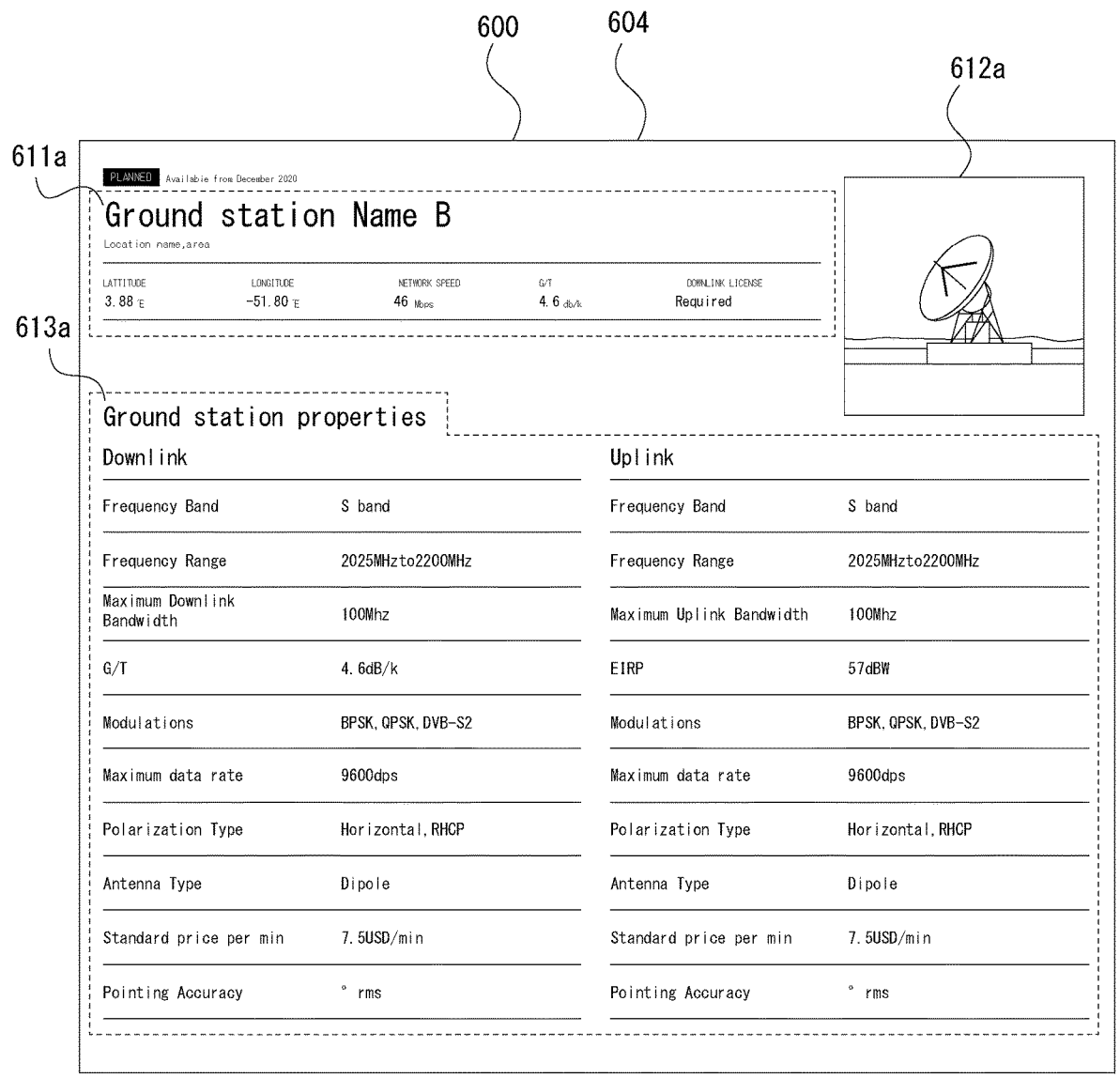
FIG. 17 is a fourth explanatory diagram of the communication plan page according to the embodiment.

The plan summary presentation area 601 illustrated in FIG. 14, the channel specification presentation area 602 illustrated in FIG. 15, the first ground station information presentation area 603 illustrated in FIG. 16, and the second ground station information presentation area 604 illustrated in FIG. 17 are integrally formed as continuous web page data, and each area is presented on the display section of the user terminal 2 according to a scroll operation by the user.

In the plan summary presentation area 601, a capacity presentation section 605, a pass schedule presentation section 615, a pass chart presentation section 606, a map presentation section 607, a selected ground station presentation section 608, etc., are presented.

In the capacity presentation section 605, how much of data can presumably be received in one day, that is, the amount of data that can be received in one day, is presented with respect to the selected ground stations.

In the pass schedule presentation section 615, how many passes can be scheduled in each of the downlink and the uplink is presented, and in the pass chart presentation section 606, a chart of time periods of the passes in each ground station is presented.

In the map presentation section 607, the locations of the ground stations selected for the generation of the communication plan are presented. This makes it easy to visually recognize the region in which each of the ground stations with respect to which the communication plan has been created is located.

In the selected ground station presentation section 608, information regarding the ground stations selected for the generation of the communication plan is presented. In the selected ground station presentation section 608, pieces of information regarding a name, a channel speed, G/T, whether or not a download license is required, a timing when an integration is to be completed in the case where an integration into the abovementioned ground station reservation service has not been done, and so on with respect to each ground station, for example, are presented.

In the channel specification presentation area 602 illustrated in FIG. 15, a specified parameter presentation section 609, a ground station information presentation section 610, etc., are presented.

In the specified parameter presentation section 609, the specified parameters of the channel are presented. In the specified parameter presentation section 609, pieces of information including a frequency band, a frequency range, a bandwidth, a modulation method, a maximum data rate, a polarization type, a link availability, an antenna type, G/T, EIRP, pointing accuracy, etc., of each of the downlink and the uplink, for example, are presented.

In the ground station information presentation section 610, information regarding each of the ground stations selected for the specified channel is presented. In the ground station information presentation section 610, pieces of information including a name, a channel speed, G/T, whether or not a download license is required, a timing when an integration is to be completed in the case where an integration into the abovementioned ground station reservation service has not been done, and so on with respect to each ground station, for example, are presented.

In each of the first ground station information presentation area 603 and the second ground station information presentation area 604, information regarding a separate one of the selected ground stations is presented.

In the first ground station information presentation area 603 illustrated in FIG. 16, a ground station information presentation section 611, an external appearance presentation section 612, a property presentation area 613, etc., are presented.

In the ground station information presentation section 611, information as illustrated in the ground station information presentation section 610 in FIG. 15 is presented with respect to the presented ground station, and in the external appearance presentation section 612, the external appearance of the presented ground station is displayed.

In the property presentation area 613, the properties concerning each of the downlink and the uplink are presented. In the property presentation area 613, pieces of information including a frequency range, a maximum bandwidth, G/T, EIRP, a modulation method, a maximum data rate, a polarization type, an antenna type, a price for use, pointing accuracy, etc., of each of the downlink and the uplink, for example, are presented.

In the second ground station information presentation area 604 illustrated in FIG. 17, a ground station information presentation section 611a, an external appearance presentation section 612a, and a property presentation area 613a with respect to another ground station are presented, similarly to the case of the above-described first ground station information presentation area 603 illustrated in FIG. 16.

In such a manner, the ground station information presentation section 611, the external appearance presentation section 612, and the property presentation area 613 are presented with respect to each of the ground stations selected for the creation of the communication plan.

In addition, the channel specification presentation area 602 as described above is separately provided for each of the channels specified for the creation of the communication plan. In the foregoing description of the present embodiment, only the channel specification presentation area 602 for the channel #1 has been described to avoid redundancy in description, but in the case where the channel #2 and a channel #3 also have been specified, for example, channel specification presentation areas 602 for the channel #2 and the channel #3 are presented continuously following the channel specification presentation area 602 for the channel #1.

The presentation of the communication plan page 600, which is automatically generated according to the selected ground stations as described above, enables the user to check the communication plan about the ground stations without the need to send a document such as an RFI or an RFP to a ground station provider. This leads to a significant reduction in time required to search for ground stations.

Further, the presented communication plan that is outputted onto a paper medium or an electronic medium can easily be used as a material when consideration is given to which ground station(s) to use.

<4. Processes in Ground Station Information Providing System>

Figure 18:
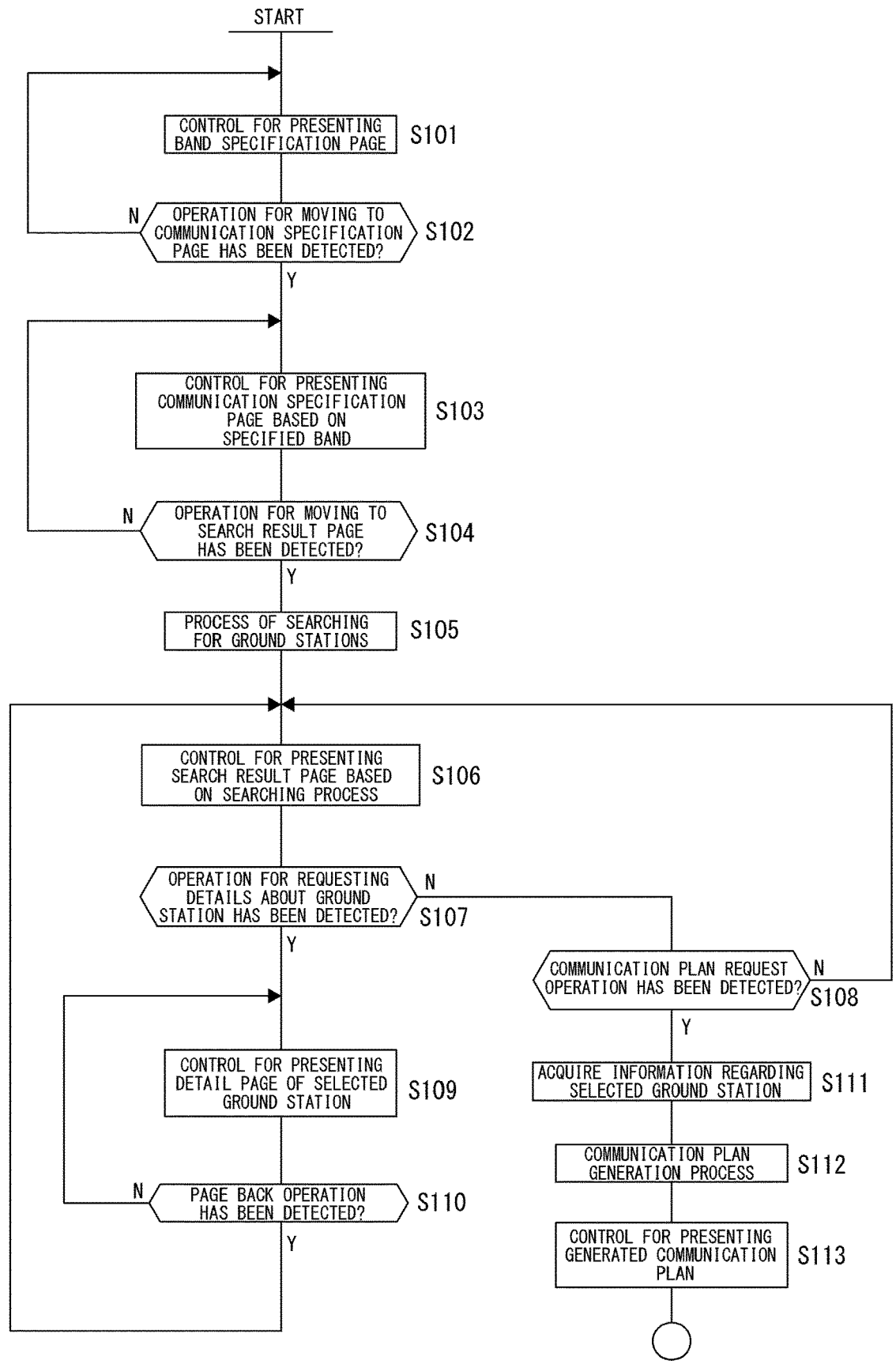
FIG. 18 is a flowchart illustrating processes performed by a server according to the embodiment.

With reference to FIG. 18, processes of the management server 1 in the ground station information providing system will now be described below.

First, the management server 1 performs control for presenting the band specification page 200 in step S101. The management server 1 acquires the web page data of the band specification page 200 from the DB 3, and performs control for presenting the web page data on the user terminal 2.

As a result, the band specification page 200 as illustrated in FIG. 5 is presented on the user terminal 2.

If selection operations by the user on the first band specification area 201 and the second band specification area 202 are detected in a state in which the band specification page 200 is controlled to be presented on the user terminal 2, the management server 1 specifies a channel of the downlink and the uplink according to the selection operations.

The band specification page 200 continues to be presented on the user terminal 2 until the management server 1 detects an operation for moving to the communication specification page 300 in step S102.

If the management server 1 detects an operation for moving to the communication specification page 300 in step S102, the management server 1 proceeds to step S103, and performs control for presenting the communication specification page 300 based on the specified frequency band(s).

If a selection operation on the communication configuration button 203 is detected, the management server 1 generates the web page data in which the specification of the channel on the band specification page 200 is reflected, and performs control for presenting the web page data on the user terminal 2.

As a result, the communication specification page 300 as illustrated in FIGS. 8 to 10 is presented on the user terminal 2.

If input and selection operations for the communication configuration are detected in a state in which the communication specification page 300 is controlled to be presented on the user terminal 2, the management server 1 sets up the communication configuration for the frequency band of the downlink selected on the band specification page 200, and the communication configuration for the frequency band of the uplink selected on the band specification page 200, according to the operations.

In addition, if a selection operation on the save button 342 is detected, the management server 1 records, on the DB 3, the search condition(s) such as the frequency band(s) of the specified channel and the communication configuration(s) thereof so as to be associated with the user ID in the case where the user is logged on the present system.

At this time, in the case where the user is not logged on the present system, the management server 1 causes a login screen to be presented on the user terminal 2. The user needs to perform the login process via the user terminal 2. If login request information is received from the user terminal 2, a login process is performed in the management server 1.

In addition, if a selection operation on the add channel button 341 is detected, the management server 1 records the search condition(s) specified with respect to the present channel. Then, the management server 1 returns to step S101 and performs control for presenting the band specification page 200 on the user terminal 2.

Thus, search conditions can be specified with respect to a plurality of channels.

The communication specification page 300 continues to be presented on the user terminal 2 until the management server 1 detects an operation for moving to the search result page 400 in step S104.

If a search request by the operation for moving to the search result page 400 is detected in step S104, the management server 1 proceeds to step S105 and performs the process of searching for ground stations.

If a selection operation on the search button 340 in FIG. 8 is detected, the management server 1 searches for matching ground stations on the basis of the search conditions specified on the band specification page 200 and the communication specification page 300. The management server 1 acquires information regarding the ground station(s) that matches the specified search conditions, from the DB 3.

Then, in step S106, the management server 1 performs control for presenting the search result page 400 based on the searching process.

The management server 1 generates web page data on the basis of the information regarding the retrieved ground station(s), and performs control for presenting the web page data on the user terminal 2.

As a result, the search result page 400 as illustrated in FIGS. 11 and 12 is presented on the user terminal 2. The user is able to check the result of the search for ground stations on the search result page 400.

If a selection operation on the ground station selection section 409 in any ground station presentation section 403 is detected in a state in which the search result page 400 is controlled to be presented on the user terminal 2, the management server 1 determines that the selected ground station is a ground station to be used when generating the communication plan.

In the state in which the search result page 400 is controlled to be presented on the user terminal 2, the management server 1 executes a monitoring loop with respect to steps S107 and S108.

If an operation for requesting details about any ground station is detected in step S107, the management server 1 proceeds to step S109 and performs control for presenting the detail page 500 of the selected ground station.

If a selection operation on the detail selection button 408 in any ground station presentation section 403 is detected, the management server 1 acquires the web page data of the detail page 500 of the selected ground station from the DB 3, and performs control for presenting the web page data on the user terminal 2.

As a result, the detail page 500 as illustrated in FIG. 13 is presented on the user terminal 2. The user is able to check, on the detail page 500, detailed information regarding the ground station with respect to which the communication plan is to be created.

The detail page 500 continues to be presented on the user terminal 2 until the management server 1 detects a page back operation in step S110.

If the page back operation is detected in step S110 in a state in which the detail page 500 is presented, the management server 1 proceeds to step S106, and performs control for presenting the search result page 400 on the user terminal 2.

Thus, the user is able to consult the information regarding the ground station presented on the detail page 500, and then proceed to select a ground station to be used for the creation of the communication plan on the search result page 400.

Returning to the monitoring loop, if a communication plan request operation by a selection operation on the communication plan creation button 411, for example, is detected in step S108, the management server 1 proceeds to step S111.

In step S111, the management server 1 acquires information regarding the ground station(s) selected on the search result page 400.

Then, in step S112, the management server 1 performs a communication plan generation process of generating web page data representing the communication plan, on the basis of the information regarding the ground station(s) selected on the search result page 400. The information regarding the ground station(s) used for the communication plan is information for acquiring or generating the items to be presented on the communication plan page 600.

Then, in step S113, the management server 1 performs control for presenting the web page data generated in step S112, on the user terminal 2.

As a result, the communication plan page 600 as illustrated in FIGS. 14 to 17 is presented on the user terminal 2. The presentation of the communication plan page 600, which has been automatically generated according to the selected ground station(s), enables the user to easily acquire a material to be used when consideration is given to which ground station(s) to use.

Further, according to the present technology, not only the list of the ground station(s) retrieved on the basis of the search conditions specified on the band specification page 200 and the communication specification page 300 is presented on the search result page 400, but also the communication plan with respect to the selected ground station(s) can further be created by selecting the ground station(s) from the list presented on the search result page 400.

The management server 1 finishes the procedure of FIG. 18 by completing the process of step S113.

The management server 1 finishes the control for presenting each of the pages on the user terminal 2 as illustrated in FIG. 18, in response to, for example, an operation for quitting the present system by the user or the like.

Note that, as described above with reference to FIG. 4, the management server 1 is capable of performing a move between the pages, e.g., controlling the previous page to be presented, according to a user operation.

The ground station information providing system according to the present embodiment is implemented by the above-described processes of the management server 1 as illustrated in FIG. 18.

Note that the processes of the management server 1 in the ground station information providing system may also be modified as follows.

For example, although, in FIG. 18, the management server 1 performs the process of searching for ground stations in step S105 after detecting the operation for moving to the search result page 400 in step S104, the management server 1 may alternatively perform the process of searching for ground stations each time an entry of the communication configuration is detected in step S103.

In this case, the management server 1 performs a search for ground stations on the basis of the currently entered search conditions each time an entry of the communication configuration is made on the communication specification page 300. Then, the management server 1 performs control for presenting the number of ground stations that match the search conditions, on the user terminal 2.

Thus, the number of ground stations that match the entered search conditions can be presented as appropriate in, for example, the number-of-ground-stations presentation section 343 of the communication specification page 300 of FIG. 8.

<5. Summary>

The management server 1 described in the foregoing description of the embodiment includes the user interface section 11 that performs the following processes: a process of presenting the specification pages 100 for specifying a search condition or conditions with respect to a channel of a downlink and an uplink between satellite and ground stations; a process of presenting the search result page 400 that presents a list of a ground station or stations retrieved as a result of a search based on a condition or conditions entered on the specification pages 100, the search result page 400 allowing a ground station or stations to be specified and entered; and a process of presenting the communication plan page 600 that displays a communication plan employing one or more ground stations specified on the search result page 400 (see FIG. 18).

Accordingly, the list of the ground station(s) retrieved as a result of the specification of the search condition(s) with respect to the channel is presented on the search result page 400, and if a ground station(s) is selected from the presented list, a communication plan in which information regarding the selected ground station(s) is reflected is automatically created and is presented as the communication plan page 600 on the user terminal 2.

Thus, it is possible to easily retrieve, from among a number of ground stations, a ground station(s) that has such specifications as to allow the ground station(s) to communicate with a satellite station owned by the user.

Thus, it is possible to search for a plurality of ground stations together and check the result of the search as a list of ground stations put together, without the need to send a document such as an RFI or an RFP to each of a plurality of ground station providers that own ground stations that can match the conditions. This leads to a significant reduction in time required to search for ground stations that match the conditions desired by the user.

In addition, it is possible to automatically create a communication plan in which information regarding a given ground station(s) is reflected, by selecting the given ground station(s) from the list. In particular, it is also possible to automatically create a communication plan with respect to a plurality of ground stations together, and this leads to significantly saving time and effort for creating a proposal or the like when consideration is given to use of a ground station(s).

As described above, the use of the present system by the user leads to a significant reduction in lead time for preparation of a ground station(s) and a start of operation thereof.

Note that, in the present embodiment, the search section 12 performs the process of searching for ground stations on the basis of the search conditions entered on the specification pages 100, to obtain the search result, while the plan generation section 13 performs the process of generating the communication plan on the basis of the information regarding one or more ground stations specified on the search result page 400 (see FIG. 3A).

The specification pages 100 presented by the management server 1 according to the embodiment have a plurality of pages including: the band specification page 200 on which specifications concerning respective bands (frequency bands) for the downlink and the uplink between the satellite and ground stations are possible; and the communication specification page 300 on which setting up of one of or both the communication configuration for the band (frequency band) of the downlink selected on the band specification page 200 and the communication configuration for the band (frequency band) of the uplink selected on the band specification page 200 is possible (see S101 and S103 in FIG. 18).

This makes it possible to specify the frequency bands of the downlink and the uplink and the communication configurations for the frequency bands, as the conditions for searching for ground stations.

For example, the UHF (Ultra High Frequency) band, the S-band, the X-band, the Ka-band, etc., can be specified as the frequency band of the downlink, and the UHF band, the S-band, etc., can be set as the frequency band of the uplink.

In addition, in the communication configuration for each of the downlink and the uplink, the frequency range, the bandwidth, the modulation method, the maximum data rate, the polarization type, the link availability of the ground station, the minimum value of G/T, the antenna type, the pointing accuracy, etc., can be specified.

Thus, it is possible for the user to specify desired conditions to narrow the search for ground stations, enabling an intention of the user to be more accurately reflected in the search for ground stations.

Further, since the search for ground stations and the creation of the communication plan can efficiently be accomplished as described above, the number of instances of communication between the management server 1 and the user terminal 2 can be reduced to enable a reduction in the volume of communication.

The management server 1 according to the embodiment performs the process of, in response to the operation for requesting detailed information regarding a ground station being performed on the search result page 400, presenting the detail page 500 displaying the detailed information regarding the ground station (see S109 in FIG. 18).

The presentation of the detail page 500 on the user terminal 2 enables the user to check the detailed information regarding the retrieved ground station. This makes it possible to consult the detailed information regarding each ground station when selecting a ground station(s) to create the communication plan.

Accordingly, the user is able to give careful consideration to which ground station(s) to use when creating a communication plan, enabling creation of a communication plan in which an intention of the user is more accurately reflected.

Regarding the management server 1 according to the embodiment, a specification of a search condition(s) with respect to a channel of a downlink alone is possible on the specification pages 100 (i.e., the band specification page 200 and the communication specification page 300) (see S101 in FIG. 18, etc.).

This makes it possible to perform a search for ground stations on the basis of a search condition(s) with only the downlink set, without consideration given to information regarding the uplink. In some communications between satellite and ground stations, a downlink is performed while an uplink is not performed. Thus, when the uplink is not to be used, a load on the user can be reduced by omitting a search condition(s) with respect to the uplink.

Regarding the management server 1 according to the embodiment, the specification pages 100 (i.e., the band specification page 200 and the communication specification page 300) allow a search request to be made without a specification of a search condition with respect to a channel of a downlink or an uplink (see S101 in FIG. 18, etc.).

This makes it possible to perform a search for ground stations in a state in which a search condition(s) with respect to a channel of only one of the downlink and the uplink is specified, allowing a search for ground stations to be performed without specifying search conditions with respect to the channels of both the downlink and the uplink. This enables a more flexible search for ground stations.

<6. Program and Storage Medium>

While the management server 1 has been described above as an information processing device according to an embodiment of the present technology, a program according to an embodiment is a program for causing an information processing device (e.g., a CPU) to perform the processes performed in the management server 1.

A program according to an embodiment is a program for causing an information processing device to perform the following processes: a process of presenting a specification page or pages for specifying a search condition or conditions with respect to a channel of a downlink and an uplink between satellite and ground stations; a process of presenting a search result page that presents a list of a ground station or stations retrieved as a result of a search based on a condition or conditions entered on the specification page or pages, the search result page allowing a ground station or stations to be specified and entered; and a process of presenting a communication plan page that displays a communication plan employing one or more ground stations specified on the search result page.

That is, this program is a program that causes the management server 1 to perform the processes described above with reference to FIG. 18.

This program enables an information processing device to function as the management server 1. Such a program can be recorded in advance on an HDD as a recording medium contained in a device such as a computer device, a ROM in a microcomputer having a CPU, or the like. In addition, such a program can be stored (recorded) temporarily or permanently in a removable recording medium such as a semiconductor memory, a memory card, an optical disk, a magneto-optical disk, or a magnetic disk. Such a removable recording medium can be provided as what is called packaged software.

Such a program can be installed from a removable recording medium into a personal computer or the like. Alternatively, such a program can be downloaded from a download site via a network such as a LAN or the Internet.

Finally, it is to be appreciated that the foregoing description of the respective embodiments illustrates example embodiments of the present technology, and that the present technology is not limited to the above-described embodiments. Accordingly, it should naturally be understood that, other than the above-described embodiments, various modifications can be made according to design requirements and other factors without departing from the scope of the technical idea of the present technology. It is also to be understood that advantageous effects mentioned in the present specification are merely illustrative and are not restrictive, and there may be other advantageous effects.

REFERENCE SIGNS LIST

NW: Network
1: Management server
2: User terminal
3: Database
11: User interface section
12: Search section
13: Plan generation section
100: Specification page
200: Band specification page
300: Communication specification page
400: Search result page
500: Detail page
600: Communication plan page

What is claimed is:

1. An information processing device comprising:
at least one memory configured to store computer program code;
at least one processor configured to access the computer program code and operate as instructed by the computer program code, the computer program code including:
user interface code configured to cause the at least one processor to perform:
a process of presenting a specification page for specifying a search condition with respect to a channel of a downlink and an uplink between a satellite station and a ground station, wherein the specification page presented by the user interface code has a plurality of pages including:
a band specification page that allows specifications concerning a band for the downlink and a band for the uplink between the satellite station and the ground station, and
a communication specification page that allows setting up of one of or both a communication configuration for the band for the downlink selected on the band specification page and a communication configuration for the band for the uplink selected on the band specification page, wherein a specification of at least any one of a bandwidth, a modulation method, and a data rate is enabled on the communication specification page,
a process of presenting a search result page that presents a list of ground stations retrieved as a result of a search based on a condition entered on the specification page, the search result page allowing a ground station to be specified and entered, and
a process of presenting a communication plan page that displays a communication plan employing one or more ground stations specified on the search result page.

2. The information processing device according to claim 1 wherein
the user interface code is configured to cause the at least one processor to perform, in response to an operation performed on the search result page to request detailed information regarding a ground station, a process of presenting a detail page displaying the detailed information regarding the corresponding ground station.

3. The information processing device according claim 1, further comprising:
code configured to cause the at least one processor to perform a process of searching for ground stations on a basis of the search condition entered on the specification page, to obtain a search result.

4. The information processing device according to claim 1, further comprising:
plan generation code configured to cause the at least one processor to perform a process of generating a communication plan on a basis of information regarding the one or more ground stations specified on the search result page.

5. The information processing device according claim 1, wherein
a specification of a search condition with respect to a channel of a downlink alone is enabled on the specification page.

6. The information processing device according to claim 1, wherein
the specification page allows a search request to be made without a specification of a search condition with respect to a channel of a downlink or an uplink.

7. An information processing method performed by an information processing device, the method comprising:
a process of presenting a specification page for specifying a search condition with respect to a channel of a downlink and an uplink between a satellite station and a ground station, wherein the presented specification page has a plurality of pages including:
a band specification page that allows specifications concerning a band for the downlink and a band for the uplink between the satellite station and the ground station, and
a communication specification page that allows setting up of one of or both a communication configuration for the band for the downlink selected on the band specification page and a communication configuration for the band for the uplink selected on the band specification page, wherein a specification of at least any one of a bandwidth, a modulation method, and a data rate is enabled on the communication specification page;
a process of presenting a search result page that presents a list of ground stations retrieved as a result of a search based on a condition entered on the specification page, the search result page allowing a ground station to be specified and entered; and
a process of presenting a communication plan page that displays a communication plan employing one or more ground stations specified on the search result page.

8. A non-transitory storage medium readable by a computer, the storage medium storing a program for causing an information processing device to perform:
a process of presenting a specification page for specifying a search condition with respect to a channel of a downlink and an uplink between a satellite station and a ground station, wherein the specification page presented by the user interface code has a plurality of pages including:
  a band specification page that allows specifications concerning a band for the downlink and a band for the uplink between the satellite station and the ground station, and
  a communication specification page that allows setting up of one of or both a communication configuration for the band for the downlink selected on the band specification page and a communication configuration for the band for the uplink selected on the band specification page, wherein a specification of at least any one of a bandwidth, a modulation method, and a data rate is enabled on the communication specification page;
a process of presenting a search result page that presents a list of ground stations retrieved as a result of a search based on a condition entered on the specification page, the search result page allowing a ground station to be specified and entered; and
a process of presenting a communication plan page that displays a communication plan employing one or more ground stations specified on the search result page.

* * * * *